United States Patent
Fujita

(10) Patent No.: US 8,083,868 B2
(45) Date of Patent: Dec. 27, 2011

(54) ROLLING BEARING

(75) Inventor: Shinji Fujita, Kanagawa (JP)

(73) Assignee: NSK Ltd, Tokyo (JP)

( * ) Notice: Subject to any disclaimer, the term of this patent is extended or adjusted under 35 U.S.C. 154(b) by 998 days.

(21) Appl. No.: 10/586,851

(22) PCT Filed: Jan. 18, 2005

(86) PCT No.: PCT/JP2005/000543
§ 371 (c)(1),
(2), (4) Date: Jul. 20, 2006

(87) PCT Pub. No.: WO2005/068675
PCT Pub. Date: Jul. 28, 2005

(65) Prior Publication Data
US 2007/0151634 A1    Jul. 5, 2007

(30) Foreign Application Priority Data

| Jan. 20, 2004 | (JP) | P.2004-012300 |
| Mar. 17, 2004 | (JP) | P.2004-077026 |
| Mar. 30, 2004 | (JP) | 2004-100181 |
| Mar. 31, 2004 | (JP) | 2004-106487 |
| Dec. 14, 2004 | (JP) | 2004-361274 |

(51) Int. Cl.
*C23C 8/32* (2006.01)
*F16C 33/32* (2006.01)

(52) U.S. Cl. ............ 148/318; 384/492; 148/906

(58) Field of Classification Search ........... 148/319, 148/318; 420/105; 384/548
See application file for complete search history.

(56) References Cited

U.S. PATENT DOCUMENTS

| 5,413,643 A | * | 5/1995 | Murakami et al. | 148/319 |
| 6,342,109 B1 | | 1/2002 | Takemura | |
| 6,440,232 B1 | * | 8/2002 | Takemura et al. | 148/319 |
| 2002/0050308 A1 | | 5/2002 | Tanaka et al. | |

FOREIGN PATENT DOCUMENTS

EP    1355071 A1    10/2003

(Continued)

OTHER PUBLICATIONS

K. Furumura et al., << The Development of Bearing Steels for Long Life Rolling Bearings under Clean Lubrication and Contaminated Condition>>, NSK Technical Journal No. 656, pp. 15-21, (2003).

(Continued)

*Primary Examiner* — Jessee R. Roe
(74) *Attorney, Agent, or Firm* — Sughrue Mion, PLLC

(57) ABSTRACT

A rolling bearing comprises an outer ring, an inner ring and rolling elements rotatably disposed between the outer and inner rings. At least a member selected from the outer ring, inner ring and rolling elements has C content of 0.2 or more and 0.6 or less wt %, Cr content of 2.5 or more and 7.0 or less wt %, Mn content of 0.5 or more and 2.0 or less wt %, Si content of 0.1 wt % or more and 1.5 or less wt %, and Mo content of 0.5 or more and 3.0 or less wt %. Further, a carburizing or carbo-nitriding treatment, a quenching treatment and a tempering treatment are applied to the selected member. Furthermore, retained austenite on a surface thereof is 15% or more and 45% or less vol. %, and the surface hardness thereof is HRC60 or more.

7 Claims, 8 Drawing Sheets

FOREIGN PATENT DOCUMENTS

| | | | |
|---|---|---|---|
| EP | 1357308 A2 | 10/2003 |
| GB | 2235212 A | 2/1991 |
| GB | 2235698 A | 3/1991 |
| GB | 2258274 A | 2/1993 |
| GB | 2272909 A | 6/1994 |
| GB | 2278127 A | 11/1994 |
| GB | 2331527 A | 5/1999 |
| GB | 2345296 A | 7/2000 |
| JP | 2-277764 A | 11/1990 |
| JP | 6-25823 A | 2/1994 |
| JP | 6-33441 B2 | 5/1994 |
| JP | 7-86336 B2 | 9/1995 |
| JP | 7-88851 B2 | 9/1995 |
| JP | 8-10015 B2 | 1/1996 |
| JP | 2541160 B2 | 7/1996 |
| JP | 2883460 B2 | 2/1999 |
| JP | 11201168 A | 7/1999 |
| JP | 3033349 B2 | 2/2000 |
| JP | 2000337389 A | 12/2000 |
| JP | 2001-221238 A | 8/2001 |
| JP | 2002-115031 A | 4/2002 |
| JP | 2002-147557 A | 5/2002 |
| JP | 2002-188643 A | 7/2002 |
| JP | 3385722 B2 | 1/2003 |
| JP | 2003-222142 A | 8/2003 |
| JP | 2003-343577 A | 12/2003 |
| JP | 2004003608 A | 1/2004 |

OTHER PUBLICATIONS

Nobuo Kino et al., "The influence of hydrogen on rolling contact fatique life and its improvement", Scientific Lecture Meeting Pre-printed Publication No. 30-02 by Automobiles Technologies Association Inc. (Nissan Motor Co., Ltd.), pp. 5-8, (2002).

Japan Office Action dated Oct. 29, 2009 issued in corresponding patent Application No. JP 2004-077026.

Supplementary European search report dated Feb. 26, 2010, issued in a counterpart application No. 05703780.6-1215.

Japanese Office Action issued on Oct. 18, 2010, in the corresponding Japanese Patent Application No. 2004-361274.

* cited by examiner

ROLLING BEARING

TECHNICAL FIELD

The present invention relates to a rolling bearing.

BACKGROUND ART

In a rolling bearing, since a rolling motion is performed between bearing rings and rolling elements, raceway surfaces of the bearing rings and rolling surfaces of the rolling elements are repeatedly subjected to contact stress. Due to this, materials used to make up the constituent members need to have qualities of being hard, withstanding load, having a long rolling fatigue life, being good with respect to resistance to wear under sliding and the like.

Then in general, steels that are used very often for materials that make up those members are, as bearing steel, a steel that is classified as SUJ2 under the Japan Industrial Standard and are, as case hardening steel, steels corresponding to those classified a SCR420 and SCM420 under the same standard. Since these materials are repeatedly subjected to contact stress as is described above, in order to acquire the required qualities such as rolling fatigue life, quenching and tempering are applied to bearing steel, and quenching and tempering are applied to case hardening steel after carburizing or carbonitriding has been applied thereof so as to obtain a hardness of not less than HRC58, not more than HRC64.

On the other hand, since bearings that are used in members auxiliary to an engine such as alternator, electromagnetic clutches, intermediate pulleys, automotive air-conditioner compressor, water pump, planetary gears in a transmission, continuously variable belt and pulley transmission and gas heat pump that is a similar drive system component support rotational shafts that are driven to rotate by being imparted power from an internal combustion engine such as the engine, the bearings are used under high-temperature, high-load, high-vibration and high-speed driving severe conditions.

Sufficient lubricating films are difficult to be formed on rolling surfaces of the bearings that are used under the severe environment, and a large tangential force is applied to the rolling surfaces of the bearings. Due to this, heat generation and surface fatigue are easy to take place as a result of metal contact. In addition, the metal contact facilitates the generation of a newly formed surface (a surface where the texture of steel is exposed). Since this newly formed surface constitutes a catalyst for tribochemical reaction, an addition agent and water that are contained in a lubricating oil are decomposed on the rolling surface of the bearing to thereby facilitate the generation of hydrogen ions. Then, these hydrogen ions so generated are adsorbed to the newly formed surface generated on the rolling surface of the bearing become hydrogen atoms, and hydrogen atoms are then collected to a stress field (in the vicinity of a maximum shearing stress position). Since a location where hydrogen atoms are collected becomes brittle, an early flaking of the rolling bearing is triggered.

In addition, in the event that foreign matters such as metal cut powder, machined dust, burrs, worn powder enter the lubricant in the rolling bearing, the bearing rings and rolling elements are damaged, the lives of the bearings are largely reduced.

Lubricating oils such as automatic transmission fluid (ATF) and continuously variable transmission fluid (CVTF) which have high friction coefficient are used for lubrication of a continuously variable belt and pulley transmission with a view to operating smoothly the torque converter, gear mechanisms, hydraulic mechanisms and wet clutches, with bearings which support an input shaft side pulley and an output shaft side pulley included in the lubrication of the continuously variable belt and pulley transmission.

Since the rolling bearings for continuously variable belt ant pulley transmissions are used under the high-vibration and high-load severe environment and under lubrication by the lubricating oils having high friction coefficient, the tribochemical reaction is easy to take place, and an early flaking is triggered in the rolling bearings.

Here, in order to make difficult the generation of tribochemical reaction, a method is considered in which a lubricating oil having high kinematic viscosity is used instead of adding addition agents such as a pressure reducing agent and a friction control agent in a lubricating oil for use. However, it is not preferable to use such a lubricating oil having high kinematic viscosity as a lubricating oil for continuously variable belt and pulley transmissions from viewpoints of fuel efficiency, power transmission efficiency from the input shaft to the output shaft and shudder life. Due to this, in the case of rolling bearings for continuously variable belt and pulley transmissions, it is effective to prolong the lives of rolling bearings using not a method of changing lubricating oils but a method of strengthening the rolling surface. The following techniques are raised as those based on this idea.

In JP-A-2003-343577, it is proposed that at least one of an inner ring, outer ring and rolling elements is formed of steel containing lots of Cr which can suppress the collection of hydrogen to the stress field and that the total content of carbon and nitrogen, content of retained austenite and hardness of the rolling surface are constituted specifically.

It is described on pages 5 to 8 in a scientific lecture meeting pre-printed document No. 30-02 (the year of 2002) issued by the Automobile Technologies Association Inc. that hydrogen ions generated by virtue of tribochemical reaction are made difficult to be adsorbed on a newly formed surface by forming a Ni film on the rolling surface of a rolling element using the electroplating method.

In addition, the following techniques are raised as techniques for prolonging lives of bearings that are to be used under the aforesaid severe conditions.

Japanese Patent Publication No. 2883460 proposes a bearing steel in which the content of C is 0.65 to 0.90% by mass, the content of Si is 0.15 to 0.50% by mass, the content of Mn is 0.15 to 1.00% by mass, the content of Cr is 2.0 to 5.0% by mass and the content of N is 90 to 200 ppm and which contains at least one of 100 to 500 ppm Al and 50 to 5000 ppm Nb. According to the technique described in this Japanese Patent Publication No. 2883460, an early flaking is made difficult to take place on the rolling surface, and the reduction in toughness after a heat treatment can be suppressed.

Japanese Patent Publication No. 2013772 proposes that the retained austenite volume is made to be not more than 8% by volume and the hardness is made to be not less than HRC 60 by working on a material in which the content of C is 0.95 to 1.10% by mass, the content of Si or Al is 1.0 to 2.0% by mass, the content of Mn is not more than 1.15% by mass, the content of Cr is 0.90 to 1.60% by mass, the balance is Fe and inevitable impurities, and the content of O is not more than 13 ppm to form the material into a predetermined shape and thereafter applying thereto quenching and high-temperature tempering at 230 to 300° C. According to the technique described this Japanese Patent Publication No. 2013772, the dimension stability at high temperatures can be improved, and the reduction in hardness can be prevented.

JP-A-2001-221238 proposes that the hardness of raceway surfaces is made to be not less than HRC 57 and fine carbides of 50 to 500 nm in diameter are dispersed and precipitated thereon by working on a material in which the content of C is 0.4 to 1.2% by mass, the contents of Si and Al are 0.7 to 2.0% by mass, the content of Mn is 0.2 to 2.0% by mass, the content of Ni is 0.1 to 3.0% by mass, the content of Cr is 3.0 to 9.0% by mass, and the equivalent weight of Cr that is calculated by the following equation is 9.0 to 17.0% by mass to form the material into a predetermined shape and thereafter applying thereto quenching and tempering.

$$\text{Cr Equivalent Weight} = [\text{Cr}] + 2[\text{Si}] + 1.5[\text{Mo}] + 5[\text{V}] + 5.5[\text{Al}] + 1.75[\text{Nb}] + 1.5[\text{Ti}] \quad (1)$$

where in the equation (1) above, [Cr], [Si], [Mo], [V], [Al], [Nb] and [Ti] denote the contents (percent by mass) of Cr, Si, Mo, V, Al, Nb and Ti.

According to JP-A-2001-221238, since the minute carbides dispersed and precipitated on the surface of the raceway trap hydrogen, an early flaking is restrained from occurring on the surface of the raceway.

In addition, there are proposed various types of rolling bearings which can keep long lives even in the event that the rolling bearings are used under a lubrication with tramp materials as in a case where foreign matters enter and remain in a lubricant in the interior of the rolling bearings.

For example, Japanese Patent Publication Nos. 22138103 and 2128328 propose techniques in which the stress concentration on to an edge portion of a dent generated by foreign matters is relaxed so as to suppress the generation of cracks to thereby prolong the life of a rolling bearing by regulating the volumes of carbon, retained austenite and carbonitride on surface layers of bearing rings and rolling elements. In addition, Japanese Patent Publication No. 3051944 discloses a bearing component which provides a superior rolling fatigue life by being controlled with respect to steel composition, interior hardness and surface hardness.

On the other hand, needle roller bearings have a small inside diameter to outside diameter ratio. Namely, they are a bearing that has a thin thickness. However, since the needle roller bearings are characterized in that they have a relatively large load capacity for their thickness, the needle roller bearings are widely used at highly loaded locations such as in automotive transmissions and engines.

Hereinafter, for example, planetary gear bearings will be described which rotatably support planetary gears that are used widely in transmissions and the like. In planetary gear bearings, helical gears are generally used for smooth transmission of force from a planetary gear corresponding to an outer ring. Due to this, the running mark of a planetary shaft that corresponds to an inner ring becomes distorted from a force relationship between the planetary gear and the helical gear. Due to this, an uneven force is applied to a needle roller bearing disposed between the planetary gear and the planetary shaft. Consequently, edge load and skew are generated, leading to problems that the life of the bearing is reduced and that seizing is generated.

JP-A-2002-188643 discloses a technique in which at least one of a needle roller bearing and an inner member is made of a steel whose linear expansion coefficient is smaller than that of an outer member or a steel whose average retained austenite volume is not more than 2%, whereby seizing and pry are suppressed which are associated with a tendency to increase the rotation speed to higher speeds.

Furthermore, Japanese Patent Publication No. 2541160 discloses a rolling bearing which is made of an alloy steel in which the volume of retained austenite ($\gamma_R$) and the contents of C, Cr and Mo are regulated with respect to a surface layer of at least one party of bearing rings and rolling elements, and the surface hardness (Hv) of a surface layer that is subjected to carburizing or carbo-nitriding and the volume of retained austenite satisfies a predetermined relationship.

In addition, since the planetary gear bearing is used in the same container as that of gears such as a sun gear, there is caused a problem that hard foreign matters that are produced by virtue of relative contact and slide between gears enter a lubricating oil in the bearing and affects badly the life of the bearing.

Conventionally, with a view to coping with these problems, improvement in materials and normalization of clearance have been implemented. Namely, using a carbo-nitriding processing technique described in NSK Technical Journal No. 656 (the year of 1993), the volume of retained austenite in the surface layer of a bearing steel or carburizing steel is increased and a circumferential clearance and a radial clearance are made appropriate, whereby the stress concentration on to a dent edge is attempted to be relaxed so as to prolong the life of the bearing.

Patent Document No. 1: Japanese Patent Unexamined Publication No. JP-A-2003-343577

Patent Document No. 2: Japanese Patent Examined Publication No. JP-B-2883460

Patent Document No. 3: Japanese Patent Examined Publication No. JP-B-2013772

Patent Document No. 4: Japanese Patent Unexamined Publication No. JP-A-2001-221238

Patent Document No. 5: Japanese Patent Examined Publication No. JP-B-2138103

Patent Document No. 6: Japanese Patent Examined Publication No. JP-B-2128328

Patent Document No. 7: Japanese Patent Examined Publication No. JP-B-205944

Patent Document No. 8: Japanese Patent Unexamined Publication No. JP-A-2002-188643

Patent Document No. 9: Japanese Patent Examined Publication No. JP-B-2541160 Non-Patent Document No. 1: Scientific Lecture Meeting Pre-printed Publication No. 30-02 (the Year of 2002) by Automobiles Technologies Association Inc.

Non-Patent Document No. 2: NSK Technical Journal No. 656 (the Year of 1993)

DISCLOSURE OF THE INVENTION

Problem that the Invention is to Solve

Irrespective of the aforesaid conventional techniques that have been proposed for better improvement, further improvements have still been required when expecting that in the environment where rolling bearings are used, high temperatures and high speeds are further sought for, leading to severer conditions in association with the tendency to produce members which are smaller in size and lighter in weight and which provide higher performances and higher outputs. In addition, there has still remained a room for improvement with respect to an effective suppression of early flaking that is attributed to the collection of hydrogen on to the field of stress.

Then, the invention was made to provide a rolling bearing which keeps a high dimension stability and a long life even in the event that the bearing is used under severe conditions where the bearing is driven at high temperatures and high speeds under lubrication with tramp materials using a lubricating oil of high friction coefficient and low viscosity.

Means for Solving the Problem

With a view to solving the problem, according to the first aspect of the invention, there is provided a rolling bearing comprising an outer ring, an inner ring and a plurality of rolling elements disposed between the outer and inner rings in such a manner as to freely roll therebetween, wherein at least a member selected from the outer ring, inner ring and rolling elements is such that:

the content of C is not less than 0.2 wt %, not more than 0.6 wt %;

the content of Cr is not less than 2.5 wt %, not more than 7.0 wt %;

the content of Mn is not less than 0.5 wt %, not more than 2.0 wt %;

the content of Si is not less than 0.1 wt %, not more than 1.5 wt %;

the content of Mo is not less than 0.5 wt %, not more than 3.0 wt %;

a carburizing or carbo-nitriding treatment, a quenching treatment and a tempering treatment are applied thereto;

the volume of retained austenite on a surface thereof is not less than 15%, not more than 45% by volume ratio; and the surface hardness is not less than HRC60.

According to a second aspect of the invention, there is provided a rolling bearing comprising an outer ring, an inner ring and a plurality of rolling elements disposed between the outer and inner rings in such a manner as to freely roll therebetween, wherein at least a member selected from the outer ring, inner ring and rolling elements is such that:

the content of C is not less than 0.8 wt %, not more than 1.2 wt %;

the content of Cr is not less than 2.0 wt %, not more than 4.0 wt %;

the content of Mn is not less than 0.1 wt %, not more than 2.0 wt %;

the content of Si is not less than 0.5 wt %, not more than 1.5 wt %;

the content of Mo is not less than 0.1 wt %, not more than 2.0 wt %;

a carburizing or carbo-nitriding treatment, a quenching treatment and a tempering treatment are applied thereto;

the volume of retained austenite on a surface thereof is not less than 15%, not more than 45% by volume ratio; and the surface hardness is not less than HRC60.

According to a third aspect of the invention, the selected member is further such that:

the sum of carbon concentration and nitrogen concentration on the surface thereof is not less than 1.0 wt %, not more than 2.5 wt %.

According to a fourth aspect of the invention, the selected member is further such that:

the content of V is not more than 2.0 wt %; and the content of Ni is not more than 2.0 wt %.

According to a fifth aspect of the invention, the selected member is further such that:

the residual of a precipitate of at least one of carbide and carbonitride is not less than 15%, not more than 35% by area ration.

According to a sixth aspect of the invention, the selected member is further such that:

the precipitate is an Fe—Cr, Mo system precipitate comprising at least one of double carbonitrides of $M_7C_3$ type, $M_{23}C_6$ type and $M_{23}(C, N)_6$ type.

According to a seventh aspect of the invention, the selected member is further such that:

the Fe—Cr, Mo system precipitate contains 30 wt % or more of Cr and Mo in total.

According to an eighth aspect of the invention, the selected member is further such that:

The maximum value of compression residual stress at a surface layer portion thereof is not less than 1500 MPa, not more than 2000 MPa.

According to a ninth aspect of the invention, the selected member is at least one of the inner ring and the rolling elements.

According to a tenth aspect of the invention, the selected member is further such that:

the average retained austenite volume is not more than 8% by volume ratio.

According to an eleventh aspect of the invention, the selected member is further such that:

the average retained austenite volume is not more than 2.5 times a sum of the contents of Cr and Mo.

Note that the rolling surface of the rolling bearing of the invention is preferably lubricated with a lubricating oil of a friction coefficient of 0.10 or more and a kinematic viscosity at 100° C. of 8 cst.

In addition, the rolling bearing of the invention can be applied to a rolling bearing for supporting a rotational shaft that is driven by power from an engine.

Additionally, the rolling bearing of the invention can be used to support a pulley around which a belt of a continuously variable belt and pulley transmission is wound.

Furthermore, in a case where a carbo-nitriding treatment is applied, when the surface nitrogen concentration is not less than 0.1 wt %, the resistance to wear is increased, but when it exceeds 0.5 wt %, grinding work becomes difficult to be performed. Therefore, the surface nitrogen concentration is preferably not less than 0.1 wt %, not more than 0.5 wt % and more preferably not less than 0.2 wt %, not more than 0.3 wt %.

Hereinafter, the critical importance of the numerical limitations according to the first aspect of the invention will be described in detail.

[The Content of C (by Mass Ratio): 0.2 to 0.6%]

C (carbon) is an effective element to increase resistance to wear by dissolving in a base to increase the strength thereof after quenching and tempering and combining with a carbide forming element such as Fe, Cr, Mo and V. When the content of C is less than 0.2 wt %, δ ferrite is generated, and there may occur a case where the toughness is reduced. In addition, the duration of carburizing or carbo-nitriding process that is required to form a hardened layer to a sufficient depth is increased, and there may occur a case where a remarkable increase in cost is called for.

Note that a preferred range of C content is 0.25 to 0.5%.

[The Content of Cr (by Mass Ratio): 2.5 to 7.0%]

Cr (chrome) is an effective element to increase hardenability, resistance to temper softening, resistance to corrosion and rolling fatigue life by dissolving in a base. In addition, Cr is also an effective element to stabilize the base structure by making difficult the movement of an interstitial solid-solution element such as C and N (nitrogen) and to suppress an early flaking attributed to the collection of hydrogen on to a stress field. Furthermore, since a harder double carbide such as $(Fe, Cr)_3C$ or $(Fe, Cr)_7C_3$ and a harder double carbonitride such as $(Fe, Cr)_3 (C, N)$ or $(Fe, Cr)_7(C, n)_3$ come to be distributed minutely in steel, Cr has a function to increase resistance to wear.

When the content of Cr exceeds 7.0%, cold workability, machinability and carburization processing quality are reduced, and there may occur a case where a remarkable cost increase is called for. In addition, there may occur a case where coarse and large eutectic carbide and eutectic carbonitride are formed to remarkably reduce the rolling fatigue life and strength. Note that a preferred range of Cr is 2.5 to 6.0%.

[The content of Mn (by Mass Ratio): 0.5 to 2.0%]

Mn (manganese) is an effective element to secure a retained austenite amount and to increase hardenability by functioning as a deoxidizing agent at the time of producing steel and decreasing the Ms (martensitic transformation) point. When the content of Mn exceeds 2.0%, since not only the cold workability and machinability are reduced but also the martensitic transformation initiation temperature is remarkably reduced, a lot of retained austenite remains after carburizing process and a sufficient hardness cannot be obtained. Note that a preferred range of the Mn content is 0.8 to 1.5% and a more preferred range thereof is 0.8 to 1.2%.

[The Content of Si (by Mass Ratio): 0.1 to 1.5%]

Since Si (silicone) functions, similar to Mn, as a deoxidizing agent at the time of producing steel and dissolves, similar to Cr and Mn, in a base to strengthen martensite, silicone is an effective element to prolong the bearing life. In order to obtain this effect, the Si content needs to be not less than 0.1%. On the other hand, the Si content exceeds 1.5%, there may occur a case where machinability, forgeability, cool workability and carburization process quality are reduced. Note that a preferred range of the Si content is 0.1 to 0.7%.

[The Content of Mo (by Mass Ratio): 0.5 to 3.0%]

Mo (molybdenum) is an effective element which dissolves, similar to Cr, in a base to increase the hardenability, resistance to temper softening, resistance to corrosion and rolling fatigue resistance. In addition, molybdenum is an effective element to stabilize, similar to Cr, the structure by making difficult the movement of interstitial solid-solution element such as C and N and to suppress an early flaking attributed to the collection of hydrogen on to a stress field. Furthermore, molybdenum also has a function to increase resistance to wear by forming a minute carbide such as $Mo_2C$ and a minute carbonitride such as $Mo_2 (C, N)$.

When the Mo content exceeds 3.0%, cold workability and machinability are reduced, and there may trigger a risk that a remarkable cost increase is called for. In addition, there may be caused a case where coarse, large eutectic carbide and eutectic carbonitride are formed to thereby remarkably reduce the rolling fatigue life and the strength. Note that a preferred range of the Mo content is 0.5 to 1.5%.

[The Content of V (by Mass Ratio): 2.0% or Less]

V (vanadium) is an effective element which forms carbide, nitride and carbonitride to dissolve therein and forms minute carbide such as VC, minute nitride such as VN and minute carbonitride such as V (C, N), to thereby increase the strength and resistance to wear. In addition, similar to Cr and Mo, V is an effective element which stabilizes the structure by making difficult the movement of interstitial solid-solution such as C and N and suppresses an early flaking attributed to the concentration of hydrogen on to a stress field.

In order to obtain this effect, while the content of V is preferably increased by as much as possible, in the event that the relevant content is too much, cold workability and machinability are reduced, and there may be caused a case where a remarkable increase is called for. In addition, there may be caused a risk that coarse, large eutectic carbide and eutectic carbonitride are formed to thereby remarkably reduce rolling fatigue life and strength. Consequently, an upper limit of the V content is determined to be 2.0%.

[The Content of Ni (by Mass Ratio): 2.0% or Less]

Ni (nickel) is an effective element which stabilizes austenite, suppresses the formation of δ ferrite and increases toughness. On the other hand, in the event that the content of Ni is too large, a lot of retained austenite remains and a sufficient quenching hardness cannot be obtained. Consequently, an upper limit of the Ni content is determined to be 2.0%.

[As to Heat Treatment]

First of all, after a material made of the steel that is formed as has been described heretofore is worked into a predetermined shape through forging or machining, a carburizing or carbo-nitriding process is implemented. This carburizing or carbo-nitriding process is performed by heating the material and holding it heated for several hours at an ambient temperature of 900 to 960° C. in an oven in which RX gas plus enriched gas are introduced for carburizing and RX gas plus enriched gas plus ammonia gas are introduced for carbo-nitriding.

Next, while a quenching process and a tempering process are performed, when implementing a quenching direct after carburizing or carbo-nitriding, a structure results which comprises mainly retained austenite of a large particle diameter and lens-like martensite, it is difficult to obtain a life improvement effect. Due to this, it is preferable that the material is held tentatively at a temperature equal to or lower than an A1 transformation point or is cooled down to a room temperature after carburizing or carbo-nitriding, is then again heated to a temperature of 820 to 900° C. for quenching and is tempered at a temperature of on the order of 160 to 200° C., whereby a good structure is obtained in which minute and hard carbides, when carburized, and carbonitrides, when carbo-nitrided, are dispersed evenly in a matrix comprising martensite and austenite.

[The Total Content of C and N at the Surface Layer Portion (by Mass Ratio): 1.0 to 2.5%]

The hardness, retained austenite volume and residual of the precipitate which is composed of at least one of carbide and carbonitride are able to be made to fall within the following ranges by making the contents of C and N at the surface layer portion which constitutes the rolling surface be not less than 1.0%, preferably not less than 1.2%. On the other hand, when the total content of C and N at the surface layer portion is too much, since a resulting precipitate becomes coarse and large to thereby reduce the rolling fatigue life, the upper limit thereof is determined to be 2.5%.

[Hardness at the Surface Layer Portion: Not Less Than HRC60]

In order to reduce the wear and surface fatigue of the rolling surface to thereby increase the rolling fatigue life, the hardness of the surface layer portion which constitutes the rolling surface needs to be not less than HRC60 by Rockwell hardness. Note that a preferred range of the hardness of the surface layer portion is not less than HRC61.

[Retained Austenite Volume at the Surface Layer Portion (by Volume Ratio): 15 to 45%]

Retained austenite at the surface layer portion that constitutes the rolling surface functions to reduce the surface fatigue. In order to obtain this effect, the retained austenite volume needs to be not less than 15%. On the other hand, the retained austenite volume at the surface layer portion exceeds 45%, since there may be caused a case where hardness is reduced and a deformation is generated on a bearing ring when a bearing is fabricated, the upper limit of retained austenite volume is determined to be 45%. Note that a preferred range of the retained austenite volume at the surface layer portion is 20 to 40%.

[The Residual of Precipitate Composed of at Least One of Carbide and Carbonitride (by Area Ratio): 15 to 35%]

In the event that the lubricating film on the rolling surface is partially broken to thereby allow hydrogen ions generated through tribochemical reaction to enter to be dispersed in the steel, carbide and carbonitride residing in the surface layer portion which constitutes the rolling surface trap the hydrogen ions so dispersed to thereby suppress the collection of hydrogen on to a stress field.

When the residual within the rolling surface of the precipitate composed of at least one of carbide and carbonitride is less than 15%, the effect cannot be obtained sufficiently. On the other hand, when the residual of the precipitate exceeds 35%, carbide and carbonitride are made to become coarse and large to thereby reduce the rolling fatigue life.

[Maximum Value of Compression Residual Stress at the Surface Layer Portion: 150~2000 MPa]

In order o suppress the generation and propagation of cracks on the rolling surface, the maximum value of compression residual stress at the surface portion needs to be not less than 150 Ma. On the other hand, in order to impart a compression residual stress of more than 2000 MPa to the surface layer portion, since mechanical work such as a shot peening treatment becomes necessary, an increase in cost is called for.

[As to Average Retained Austenite Volume]

When the volume of retained austenite is large, there may be caused a risk that deformation is easy to be generated when subjected to moment load and edge load and skew are generated, leading to a short bearing life. Furthermore, when used under high temperatures, since the retained austenite is decomposed to generate a dimensional change, there may be caused a risk that the clearance is reduced to thereby generate seizing. Consequently, the average retained austenite volume needs to be not more than 8 vol. %.

Next, the critical importance of the numerical limitations according to the second aspect of the invention will be described in detail.

[The Content of C (by Mass Ratio): 0.8 to 1.2%]

C (carbon) is an effective element to increase resistance to wear by dissolving in a base to increase the strength thereof after quenching and tempering and combining with a carbide forming element such as Fe, Cr, Mo and V. When the content of C exceeds 1.2%, coarse, large eutectic carbide and eutectic carbonitride are easy to be formed at the time of producing steel, whereby rolling fatigue life and strength are reduced, and forgeability, cold workability and machinability are reduced, thereby leading to a risk that a cost increase is called for. Note that a preferred range of the C content is 0.9 to 1.1%.

[The Content of Cr (by Mass Ratio): 2.0 to 4.0%]

Cr (chrome) is an effective element to increase hardenability, resistance to temper softening, resistance to corrosion and rolling fatigue life by dissolving in a base. In addition, Cr is also an effective element to stabilize the base structure by making difficult the movement of an interstitial solid-solution element such as C and N (nitrogen) and to suppress an early flaking attributed to the collection of hydrogen on to a stress field. Furthermore, since a harder double carbide such as (Fe, Cr)$_3$C or (Fe, Cr)$_7$C$_3$ and a harder double carbohitride such as (Fe, Cr)$_3$(C, N) or (Fe, Cr)$_7$(C, n)$_3$ come to be distributed minutely in steel, Cr has a function to increase resistance to wear.

When the content of Cr is less than 2.0%, since Fe$_3$C and Fe$_3$(C, N) are precipitated, an early flaking is generated. Note tat a preferred range of the Cr content is 2.5 to 3.5%.

[The content of Mn (by Mass Ratio): 0.1 to 2.0%]

Mn (manganese) is an effective element to secure a retained austenite amount and to increase hardenability by functioning as a deoxidizing agent at the time of producing steel and decreasing the Ms (martensitic transformation) point. In order to obtain this effect, the content of Mn is determined to be not less than 0.1%. On the other hand, when the content of Mn exceeds 2.0%, since the martensitic transformation initiation temperature is largely reduced, there may be caused a case where a lot of retained austenite remains after carburizing treatment, whereby a sufficient hardness cannot be obtained and cold workability and machinability are reduced. Note that a preferred range of the Mn content is 0.5 to 1.5% from the aforesaid viewpoints.

[The Content of Si (by Mass Ratio): 0.5 to 1.5%]

Si (silicone) functions, similar to Mn, as a deoxidizing agent at the time of producing steel and dissolves in a base to strengthen martensite, silicone is an effective element to prolong the bearing life. In order to obtain this effect, the Si content is determined to be not more than 1.5%. In addition, normally, the content of Si is determined to be 0.2 to 0.5% because it reduces the machinability, forgeability and cold workability of the bearing. In order to increase resistance to temper softening and anti-high temperature properties, however, in this application for patent, the lower limit of the Si content is determined to be 0.5%. Note that a preferred range of the Si content is 0.8 to 1.2%.

[The Content of Mo (by Mass Ratio): 0.1 to 2.0%]

Mo (molybdenum) is an effective element which dissolves, similar to Cr, in a base to increase the hardenability, resistance to temper softening, resistance to corrosion and rolling fatigue resistance. In addition, molybdenum is an effective element to stabilize, similar to Cr, the structure by making difficult the movement of interstitial solid-solution element such as C and N and to suppress an early flaking attributed to the collection of hydrogen on to a stress field. Furthermore, molybdenum also has a function to increase resistance to wear by forming a minute carbide such as Mo$_2$C and a minute carbonitride such as Mo$_2$ (C, N)

In order to obtain this effect, the content of Mo needs to be not less than 0.1%. While the content of Mo is preferably determined to be as much as possible, When the Mo content is too much, there may be caused a risk that cold workability and machinability are reduced to call for a large increase in cost and that coarse, large eutectic carbide and eutectic carbonitride are formed to thereby reduce largely rolling fatigue life and strength of a resulting bearing. Note that a preferred range of the Mo content is 0.5 to 1.5%.

[As to Carbide and Carbonitride Residing at the Rolling Surface]

Normally, most of the carbide contained in bearing steel (SUJ1 to 5) is expressed by an M$_3$C (comprising three metal atoms and one carbon atom) type Fe$_3$C. When an alloy element such as Cr and Mo is added to steel, however, the crystal structure of the carbide is changed, and a phase transformation occurs from the MC$_3$ type carbide to an M$_7$C$_3$ type or M$_{23}$C$_6$ type Fe—Cr, Mo system double carbide. A similar phase transformation occurs on the crystal structure of carbonitride from an M$_3$(C, N) type carbonitride to an M$_7$ (C, N)$_3$ type or M$_{23}$ (C, N)$_6$ type Fe—Cr, Mo system double carbonitride.

As to, in particular, bearings for continuously variable belt and pulley transmissions, the inventor et al. paid attention to the fact that when the aforesaid phase transformation occurs, an early flaking is easy to be generated on bearings for continuously variable belt and pulley transmissions. Then, the inventor et al. found that the early flaking inherent in bearings for continuously variable belt and pulley transmissions could be suppressed while the bearings were used by causing an Fe—Cr, Mo system precipitate comprising at least one of the aforesaid double carbide and double carbonitride to be dispersed and precipitated in advance to thereby make it difficult for a phase transformation to be generated during the use of the continuously variable belt and pulley transmissions.

In order to obtain this effect, 30% or more by area ratio of the precipitate composed of at least one of carbide and carbonitride on the rolling surface is preferably composed of a Fe—Cr, Mo system precipitate that is made up of at least one of the $M_7C_3$ type or $M_{23}C_6$ type double carbide and the $M_7(C, N)_3$ type or $M_{23}(C, N)_6$ type double carbonitride.

[The Total Content of Cr and Mo of Fe—Cr, Mo System Precipitate (by Mass Ratio): not less than 30%]

Since the fusion point of Fe is 1536° C., the same of Cr is 1857° C. and that of Mo is 2617° C., the fusion points of the $M_7C_3$ type or $M_{23}C_6$ type Fe—Cr, Mo system double carbide and the $M_7(C, N)_3$ type or $M_{23}(C, N)_6$ type Fe—Cr, Mo system double carbonitride are higher than those of the $M_3C$ type $Fe_3C$ and $M_3(C, N)$ type $Fe_3(C, N)$. Consequently, since the fusion point of the Fe—Cr, Mo system precipitate can be increased further by determining that the total content of Cr and Mo of the Fe—Cr, Mo system precipitate is not less than 30%, the phase transformation can further be suppressed.

[Other Inevitable Compositions]

O (Oxygen) and Ti (titanium) constitute, respectively, an oxide system intervening substance and a Ti system intervening substance, and it is preferable that the contents thereof are small. Due to this, the content of O is preferably not more than 12 ppm and the content of Ti is preferably not more than 30 ppm.

DESCRIPTION OF REFERENCE NUMERALS

1: inner ring; 2: outer ring; 3: ball (rolling element); 120: alternator (auxiliary equipment of an engine); 121: rotational shaft; 122: pulley; 123, 124: rolling bearings; 203: planetary gear unit; 211: sun gear; 212: ring gear; 213: planetary gear; 214: carrier; 215: planetary shaft; 217: needle roller; 220: planetary shaft; 221: outer ring; 222: needle roller; 301: primary pulley (input shaft side pulley); 301*a*, 301*b*: rolling bearings; 302: secondary pulley (output side pulley); 302*a*, 302*b*: rolling bearings; 303: belt; 310: input shaft; 320: output shaft.

BEST MODE FOR CARRYING OUT THE INVENTION

A first embodiment of a rolling bearing according to the invention will be described in detail by reference to the drawings.

Figure 1:
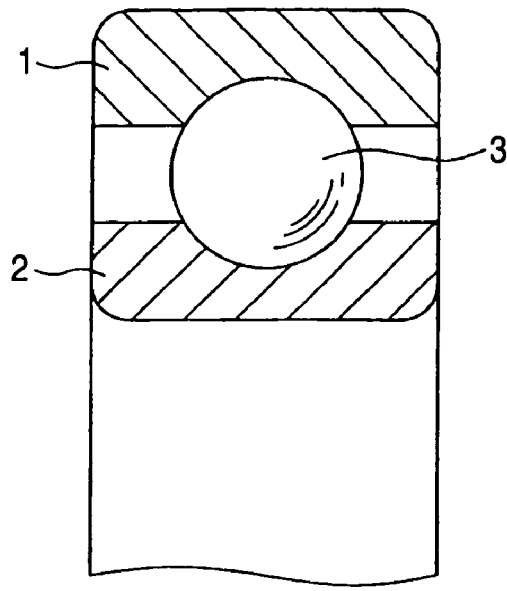
[FIG. 1] is a partial vertical sectional view showing the construction of a deep-groove ball bearing which is an embodiment of a rolling bearing according to the invention.

A deep groove ball bearing shown in FIG. 1 includes an inner ring 1, an outer ring 2 and a plurality of ball (rolling elements) 3 disposed between the inner ring 1 and the outer ring 2 in such a manner as to freely roll. At least one of the inner ring 1, the outer ring 2 and the balls 3 is made of an alloy steel which contains not less than 0.2%, not more than 0.6% by mass of carbon, not less than 2.5%, not more than 7% by mass of chrome, not less than 0.5%, not more than 2% by mass of manganese, not less than 0.1%, not more than 1.5%.by mass of silicone, not less than 0.5%, and not more than 3% by mass of molybdenum. Then, a carburizing or carbo-nitriding treatment is applied, and surface layer portions, which are hardened by this heat treatment, are formed on surfaces of raceways of the inner ring 1 and the outer ring 2 and rolling surfaces of the balls 3. In addition, the volume of retained austenite is not less than 15 vol. %, not more than 45 vol. %, and the average retained austenite volume (unit is percent by volume) is not more than 2.5 times a sum of the content (unit is percent by mass) of chrome and the content (unit is percent by mass) of molybdenum in the alloy steel. Even in the event that the deep groove ball bearing that is constructed as has been described heretofore is used under high temperatures and lubrication with an lubricating oil including foreign matters, the bearing still has a superior dimension stability and a long life.

Embodiment 1

The invention will be described further specifically by reference to an embodiment. Inner rings and outer rings which are made of various alloy steels that have compositions shown in Table 1, and rolling elements made of a JIS steel type referred to as SUJ2 were prepared, and deep groove ball bearings were manufactured under a designation number of 6206 for durability tests. Note that compositions of the alloy steel other than C, Si, Mn, Cr, Mo are iron and inevitable impurities. In addition, a steel type H in Table 1 is a JIS steel type designated as SUJ2. Furthermore, underlines imparted to numeral values in Table 1 means that the underlined numerical values deviate from recommended ranges of the invention.

TABLE 1

| Types of Alloy Steels | Contents of Alloy Elements (wt %) | | | | |
|---|---|---|---|---|---|
| | C | Si | Mn | Cr | Mo |
| A | 0.4 | 0.4 | 1.0 | 2.5 | 1.5 |
| B | 0.35 | 0.4 | 1.2 | 3.0 | 0.5 |
| C | 0.4 | 0.3 | 1.0 | 3.0 | 0.5 |
| D | 0.45 | 0.3 | 0.8 | 4.0 | 1.0 |
| E | 0.5 | 0.5 | 1.2 | 5.0 | 1.2 |
| F | 0.2 | 0.45 | 0.6 | 6.0 | 1.5 |
| G | 0.6 | 1.5 | 2.0 | 7.0 | 3.0 |
| H | <u>1.0</u> | 0.3 | 0.3 | <u>1.5</u> | — |
| I | 0.4 | 0.5 | 1.1 | <u>2.0</u> | 0.5 |
| J | 0.5 | 0.4 | 0.8 | <u>8.0</u> | 1.0 |
| K | <u>0.7</u> | 0.35 | 0.9 | 3.5 | 2.0 |

TABLE 1-continued

| Types of Alloy Steels | Contents of Alloy Elements (wt %) | | | | |
|---|---|---|---|---|---|
| | C | Si | Mn | Cr | Mo |
| L | 0.5 | <u>1.6</u> | 1.0 | 4.0 | 0.7 |
| M | 0.4 | 0.75 | <u>2.5</u> | 5.0 | 1.0 |
| N | 0.4 | 0.3 | 0.9 | 4.0 | <u>0.4</u> |
| O | 0.5 | 0.3 | 1.5 | 3.0 | <u>3.5</u> |

Inner rings and outer rings were manufactured by applying a cutting process by turning to alloy steels to form them into predetermined dimensions, applying a carburizing treatment or carbo-nitriding treatment, which will be described later on, to the alloy steels so formed, quenching and tempering the alloy steels so carburized or carbo-nitrided at predetermined temperatures and thereafter, applying a finishing grinding to the alloy steels so quenched and tempered. Carburizing treatment conditions are such that atmosphere is a mixture of RX gas and enriched gas, the duration of treatment is about 3 to 5 hours and the treatment temperature is 900 to 960° C. Then, the alloy steels so treated were air cooled down to a normal temperatures, were quenched at 840° C. for an hour and were further tempered at 180° C. for two hours. Carbo-nitriding treatment conditions are such that atmosphere is a mixture of RX gas, enriched gas and ammonia gas (5%), the duration of treatment is about 3 to 5 hours, and the treatment temperature is 900 to 960° C. Then, the alloy steels were oil cooled and thereafter were quenched and tempered under the same conditions as those under which the carburizing treatment was performed.

Properties (superficial retained austenite volume ($\gamma_R$) and average retained austenite volume ($\gamma_{R\ mean}$)) of inner rings and outer rings so obtained were summarized to be shown in Table 2. In addition, a sum (hereinafter, referred to as [Cr %+Mo %]) of the content of chrome Cr % and the content of molybdenum Mo % in the alloy steels and a ratio ($\gamma_{R\ mean}$/Cr %+Mo %) between average retained austenite volume ($\gamma_{R\ mean}$) and Cr %+Mo % were summarized to be shown in Table 2. Note that the retained austenite volume ($\gamma_R$) was measured by an X-ray diffraction method. In addition, underlines imparted to numeric values in Table 2 mean that the numeric values so underlined deviate from recommended ranges of the invention.

Next, a durability test method will be described. Deep groove ball bearings that were obtained by assembling together the inner rings, outer rings and rolling elements were rotated under conditions of an axial load of 3.5 GPa and a rotation speed of 3000 $min^{-1}$ while immersed in oil for lubrication. Then, a point in time when flaking and seizing are generated in at least one of the inner and outer rings is to be regarded as life, and 90% residual life ($L_{10}$ life) was measured. When neither flaking nor seizing was generated even in the event that the deep groove ball bearings were rotated for 1500 hours, $L_{10}$ life was determined to be 1500 hours. Note that a lubricating oil whose ISO viscosity is ISO VG150 was used as a lubricating oil, and the temperature of the lubricating oil was determined to be 160° C. In addition, steel powder (whose hardness is Hv600) of a diameter of 74 to 147 μm was added to this lubricating oil as foreign matters.

The results of durability tests are shown in Table 2. As is seen from Table 2, the lives of Embodiment Examples 1 to 7 were far longer than those of Comparison Examples 1 to 11. In particular, since Embodiment Examples 1 to 6 showed preferred values with respect to all of the Cr content in alloy steels, superficial retained austenite volume and average retained austenite volume (a value of $\gamma_{R\ mean}$/[Cr %+Mo %]), there were caused no flaking and seizing on the embodiment examples at all even at higher temperatures and under lubrication with a lubricating oil with foreign matters incorporated therein. In addition, with Embodiment Example 7, while the Cr content falls within the preferred range, since the content of Cr is slightly large, amorphous carbide was produced and the life thereof was slightly shorter than those of Embodiment Examples 3 to 6.

In contrast to this, with Comparison Examples 1 to 9, since the compositions of the alloy steels deviate from the range of the invention, the lives thereof were short compared with Embodiment Examples 1 to 7. Comparison Examples 1, 2 were made of SUJ2, and in the case of Comparison Example 1, a through hardening was applied thereto, and in the case of Comparison Example 2, a carbo-nitriding treatment was applied thereto. Since the carbo-nitriding treatment was applied to Comparison Example 2, while being longer than that of Comparison Example 1, the life of Comparison Example 2 was remarkably short compared with the respective embodiment examples.

TABLE 2

| | No. | Types of Alloy Steels | Superficial $\gamma_R$ (vol. %) | $\gamma_{Rmean}$ (vol. %) | Cr % + Mo % | $\gamma_{Rmean}$/ [Cr % + Mo %] | Life (hours) |
|---|---|---|---|---|---|---|---|
| Embodiment Examples | 1 | A | 30 | 8 | 4 | 2 | 1500 |
| | 2 | B | 20 | 3 | 3.5 | 0.85 | 1500 |
| | 3 | C | 25 | 8.75 | 3.5 | 2.5 | 1500 |
| | 4 | D | 30 | 2 | 5 | 0.4 | 1500 |
| | 5 | E | 30 | 5 | 6.2 | 0.81 | 1500 |
| | 6 | F | 25 | 15 | 7.5 | 2 | 1500 |
| | 7 | G | 30 | 8 | 10 | 0.8 | 1330 |
| Comparison Examples | 1 | H | <u>10</u> | 10 | 1.5 | <u>6.7</u> | 120 |
| | 2 | H | 30 | 15 | 1.5 | <u>10</u> | 330 |
| | 3 | I | 25 | 5 | 2 | 2.5 | 290 |
| | 4 | J | 40 | 4 | 9 | 0.44 | 550 |
| | 5 | K | <u>50</u> | 8 | 5.5 | 1.5 | 280 |
| | 6 | L | 30 | 4 | 4.7 | 0.85 | 410 |
| | 7 | M | 25 | 10 | 6 | 1.7 | 440 |
| | 8 | N | 30 | 2 | 4.4 | 0.45 | 580 |
| | 9 | O | 30 | 4 | 6.5 | 0.62 | 530 |
| | 10 | C | 25 | 9.5 | 3.5 | <u>2.7</u> | 670 |
| | 11 | D | <u>50</u> | 8 | 5 | 1.6 | 310 |

In addition, while Comparison Examples 3, 4 fall within the preferred ranges with respect to the superficial retained austenite volume and average retained austenite volume (a value of $\gamma_{R\,mean}/[Cr\%+Mo\%]$), since the Cr contents thereof are out of the preferred range, the lives thereof were short. Furthermore, since Comparison Examples 5 to 9 are out of the preferred ranges with respect to any of C, Si, Mn, Mo, the lives thereof were short. Furthermore, in the case of Comparison Examples 10, 11, while the compositions of the alloy steels were preferable, the average retained austenite volume (a value of $\gamma_{R\,mean}/[Cr\%+Mo\%]$) of Comparison Example 10 was not a preferred value and the superficial retained austenite volume of Comparison Example 11 was not a preferred value, and consequently, seizing was generated and the lives thereof were short.

Figure 2:
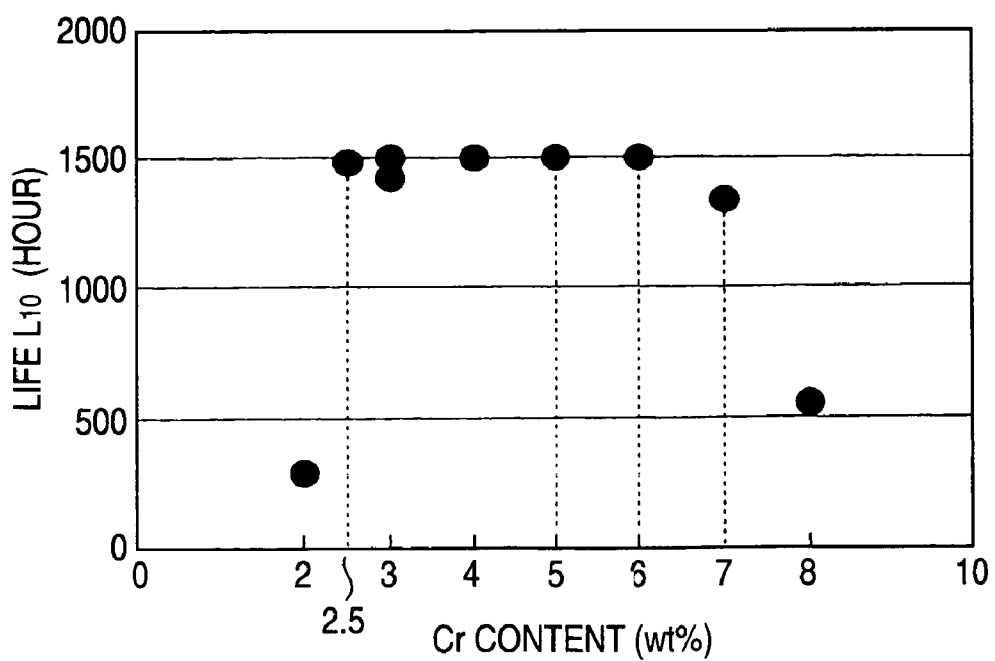
[FIG. 2] is a graph showing a relationship between the content of Cr and the life $L_{10}$ of the bearing in an alloy steel according to the embodiment shown in FIG. 1.

Here, a graph is shown in FIG. 2 which shows a correlation between the Cr content in an alloy steel and the life $L_{10}$ of a bearing. This graph is such as to plot the test results of Embodiment Examples 1 to 7 and Comparison Examples 3, 4. As is seen from this graph, the life of the bearing was long when the Cr content was not less than 2.5% by mass and not more than 7% by mass, whereas the life thereof was long when the Cr content was not less than 2.5% by mass and not more than 6% by mass.

Embodiment 2

Next, an advantage of the invention will be verified based on a second embodiment and comparison examples.

Firstly, materials A1 to O1 which are made up of steels whose compositions are shown in Table 3 are machined into shapes of inner rings and outer rings of a single row deep groove ball bearing (inside diameter 17 mm, outside diameter 47 mm, width 14 mm) whose designation number is 6303. In Table 3, underlines are imparted to contents of contained components which deviate from the ranges of the invention.

TABLE 3

| | Steel Composition (wt %) | | | | | | | |
|---|---|---|---|---|---|---|---|---|
| Material | C | Si | Mn | Cr | Mo | V | Ni | Remarks |
| A1 | 0.6 | 1.0 | 0.8 | 2.5 | 2.0 | — | — | steel of |
| B1 | 0.6 | 0.7 | 1.0 | 3.0 | 0.5 | — | 2.0 | the |
| C1 | 0.4 | 0.3 | 0.6 | 4.0 | 3.0 | — | — | present |
| D1 | 0.6 | 0.1 | 2.0 | 5.0 | 1.0 | — | 0.5 | invention |
| E1 | 0.2 | 0.8 | 0.5 | 6.0 | 1.0 | 2.0 | — | |
| F1 | 0.3 | 1.5 | 0.9 | 7.0 | 1.0 | 0.2 | — | |
| G1 | <u>1.0</u> | 0.3 | <u>0.3</u> | <u>1.5</u> | — | — | — | SUJ2 |
| H1 | 0.4 | 1.0 | 0.5 | <u>2.4</u> | 0.5 | — | — | |
| I1 | 0.4 | 0.8 | 0.8 | <u>7.1</u> | <u>0.1</u> | 1.0 | 1.0 | |
| J1 | <u>0.7</u> | 0.4 | <u>0.3</u> | 2.5 | <u>0.4</u> | — | — | |
| K1 | 0.6 | <u>1.6</u> | <u>0.4</u> | 3.0 | 0.5 | 0.3 | 0.5 | |
| L1 | 0.4 | 0.8 | <u>2.1</u> | 5.0 | — | — | 0.2 | |
| M1 | 0.5 | 0.8 | 0.5 | 3.0 | <u>3.1</u> | 0.4 | 1.5 | |
| N1 | 0.5 | 0.4 | 0.5 | 3.0 | 0.5 | <u>2.1</u> | — | |
| O1 | 0.3 | 0.3 | 0.4 | 4.0 | — | 1.0 | <u>2.1</u> | |

Then, inner rings and outer rings which are made of the materials other than G1 were heated to 900 to 960° C. as a heat treatment under an atmosphere (carbon potential Cp: 0.8 to 1.2, ammonia gas: 3 to 5%) of RX gas plus enriched gas plus ammonia gas, were held so heated for 2 to 8 hours to perform a carbo-nitriding treatment, were oil quenched and were held in the atmosphere at 160 to 180° C. for 1.5 to 2 hours for tempering.

On the other hand, an inner ring and an outer ring which were made of a material G1 was heated to 840° C. as a heat treatment, were held so heated for 20 to 60 minutes for quenching, was thereafter oil quenched and furthermore was held in the atmosphere at 170° C. for 2 hours for tempering.

A carbide, nitride and carbonitride are dispersed and precipitated on surface layer portions of any of the inner rings and outer rings that were made of the other materials than the material G1 and a carbide was dispersed and precipitated on surface layer portions of the inner ring and outer ring that were made of the material G1 through applications of those heat treatments thereto. Then, grinding work and surface finishing work were applied to the respective materials after the heat treatments.

The total content (by mass ratio) of C and N at the surface layer portions, which constitute raceway surfaces (rolling surfaces), of the inner rings and outer rings that were obtained as has been described above was measured with an electron micro analyzer at portions residing to a depth of 437 μm (5% of a ball diameter of 8.73 mm) from the raceway surface.

In addition, the hardness (Rockwell hardness) of the surface layer portions were measured based on the Rockwell hardness test method regulated under JIS Z 2245.

Furthermore, the retained austenite volume (by volume ratio) at the surface layer portions were measured with an X-ray diffraction device at portions residing to a depth of 437 μm from the raceway surface.

Furthermore, maximum values of residual stress at the surface layer portions were measured with an X-ray diffraction device at portions residing to a depth of 437 μm from the raceway surface. Maximum values of residual stress measured by this device are mean values weighted by X-ray damping within the X-ray penetration depth.

Furthermore, the residual (by area ratio) of precipitates made up of carbide and carbonitride at the raceway surface (hereinafter, referred to as a precipitate made up of carbide or the like on the raceway surface) was measured in the following manner.

First of all, after a surface work had been applied, the raceway surface was corroded by a corrosion liquid (4 g picric acid+100 ml ethanol) and thereafter were observed in 30 fields of view using an optical microscope of 1000× magnification with respect to carbide and carbonitride of 0.5 μm or greater. Then, the residual (by area ratio) of carbide and carbonitride was measured for each field of view by image processing observed images, and a mean value of the 30 fields of view was calculated.

As to the results of measurement, mean values calculated from the results of measurement of 10 inner rings and outer rings of the same composition are also shown in Table 4. In Table 4, underlines are given to those which are out of the range of the invention for each composition.

Figure 3:
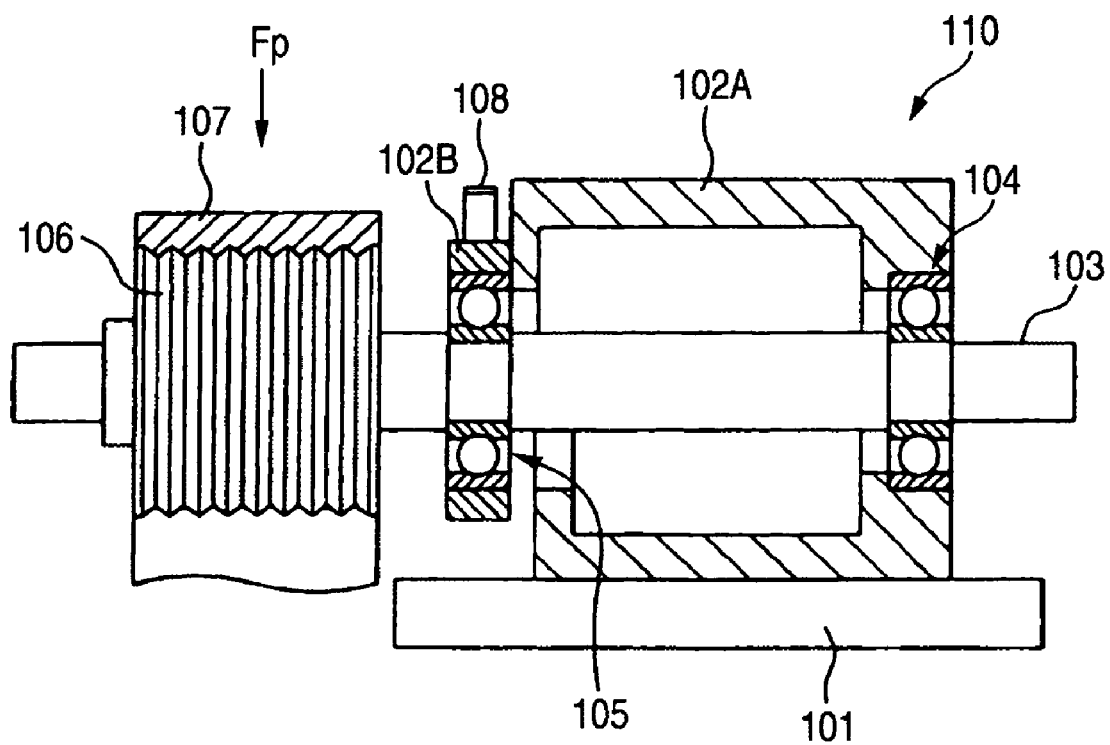
[FIG. 3] is a schematic diagram showing a life test device used in the embodiment.

Next, test bearings, which included inner rings and outer rings which were numbered from No. 101 to No. 122 and were different in steel composition and heat treatment as shown in Table 4, balls made of high-carbon chrome bearing steel classified as Type 2 (SUJ2) and to which carbo-nitriding treatments were applied and retainers made of 6-6 nylon, were set in a life test device 10 shown in FIG. 3 for life tests under test conditions of a load of what is expressed by P(loaded load)/C(kinematic rated load)=0.10 and a test temperature of 80° C. Here, ten test samples were prepared for each test bearing, and any of the test samples so prepared utilized an internal clearance of 10 to 15 μm.

As shown in FIG. 3, in this test device 110, a rotational shaft 103 is supported by a support bearing 104 and a test bearing 105, a radial load $F_p$ is imparted to an endless belt 107 that is wound around a driven pulley 106 fixed to an end of the rotational shaft 103 and a drive pulley (a pulley that is fixed to a drive shaft that is driven to rotate by a motor provided in parallel with the rotational shaft 103 and which is not shown in FIG. 3), whereby the radial load is imparted to the test bearing 104 via the rotational shaft 103.

The other end of the rotational shaft 103 is supported by the support bearing 104, and an outer ring of the support bearing 104 is fitted in a first housing 102A to be fixed in place therein. The first housing 102A is fixed to a base 101. A second housing 102B is fixed to a test bearing 105 side end of the first housing 102A, and an outer ring of the test bearing 105 is fitted in the second housing 102B to be fixed in place therein. The first housing 102A and the second housing 102B are configured such that the supporting rigidity of the support bearing 104 by the first housing 102A is high, whereas the supporting rigidity of the test bearing 105 by the test bearing 105 is low. In addition, a vibration meter 108 is mounted on an upper surface of the second housing 102B for detecting the vibration of the test bearing 105.

Figure 4:
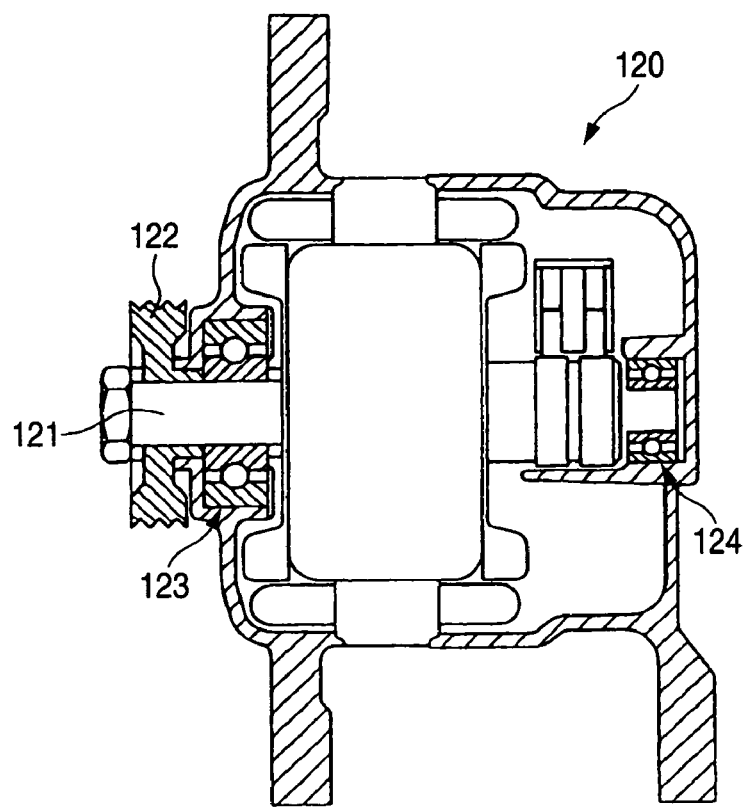
[FIG. 4] is a sectional view showing an alternator which is an example of auxiliary equipment of an engine.

In this embodiment, the tests were carried out on the assumption that, for example, in an alternator shown in FIG. 4, rolling bearings 123, 124 which support a rotational shaft 121 of a pulley 122 around which a belt, receiving power from an engine, is wound are used under a severer environment than the current environment. Namely, with the radial load imparted to the test bearing 105 shown in FIG. 3, a drastic acceleration and deceleration test was carried out by changing over the rotational speed between 9000 min$^{-1}$ and 18000 min$^{-1}$ every 9 seconds.

This life test was carried out until a flaking was generated on the outer ring or the inner ring of the test bearing and a time spent until the flaking was generated was measured. Then, a total rotating time was obtained which was spent until a flaking was generated on inner rings and outer rings which fall within 10% from the short life side that was determined from the test results of the 10 test bearing samples of the same composition based on the Weibull distribution function, and the total time so obtained was determined as life (life $L_{10}$). The results are shown in Table 4 as well.

In addition, since the calculated lives of the test bearings was 1350 hours, the life tests were finished when 1500 hours was reached. Then, when no flaking was generated in both the inner rings and the outer rings even in the event that the test finishing time was reached, their lives $L_{10}$ were determined to be 1500 hours.

TABLE 4

Compositions of Inner Rings and Outer Rings

Surface Layer Portion Constituting Raceway Surface

| No. | Materials | Heat Treatments | Contents of C + N (wt %) | Hardness (HRC) | $\gamma_R$ (vol %) | Maximum Value of Compression Residual Stress (MPa) | Residual of Precipitates Composed of Carbide or the like (area %) | Life $L_{10}$ (hours) |
|---|---|---|---|---|---|---|---|---|
| 101 | A1 | Carbo-nitriding -> quenching -> tempering | 1.6 | 62 | 15 | 1000 | 20 | 1500 |
| 102 | B1 | | 1.3 | 61 | 20 | 600 | 25 | 1500 |
| 103 | C1 | Carburizing -> quenching -> tempering | 1.4 | 61 | 45 | 300 | 15 | 1500 |
| 104 | D1 | Carbo-nitriding -> quenching -> tempering | 1.2 | 63 | 30 | 1500 | 35 | 1500 |
| 105 | E1 | | 1.5 | 62 | 30 | 2000 | 15 | 1500 |
| 106 | F1 | | 1.8 | 62 | 25 | 600 | 35 | 1500 |
| 107 | C1 | | 1.8 | 61 | 15 | 140 | 20 | 1480 |
| 108 | A1 | | 2.5 | 63 | 25 | 400 | 10 | 1240 |
| 109 | B1 | | 2 | 61 | 30 | 400 | 40 | 1220 |
| 110 | C1 | | 1.5 | 62 | 10 | 150 | 20 | 1320 |
| 111 | E1 | | 1.5 | 62 | 50 | 300 | 30 | 1120 |
| 112 | B1 | Carburizing -> quenching -> tempering | 1.1 | 60 | 10 | 500 | 14 | 880 |
| 113 | F1 | Carbo-nitriding -> quenching -> tempering | 1.8 | 62 | 50 | 200 | 36 | 730 |
| 114 | G1 | Quenching -> tempering | 1 | 62 | 7 | 0 | 7 | 120 |
| 115 | H1 | Carbo-nitriding -> quenching -> tempering | 0.8 | 59 | 30 | 1000 | 25 | 400 |
| 116 | I1 | | 1.5 | 61 | 14 | 600 | 14 | 260 |
| 117 | J1 | | 2.6 | 62 | 40 | 300 | 40 | 540 |
| 118 | K1 | | 1 | 62 | 20 | 140 | 10 | 240 |
| 119 | L1 | | 2 | 59 | 46 | 1200 | 15 | 370 |
| 120 | M1 | | 1.2 | 60 | 30 | 800 | 15 | 480 |
| 121 | N1 | | 1.4 | 62 | 25 | 500 | 30 | 580 |
| 122 | O1 | | 0.8 | 59 | 30 | 600 | 15 | 530 |

As is seen from Table 4, test bearings Nos. 101 to 107 in which the compositions of inner rings and outer rings satisfied the ranges of the invention had long lives compared with test bearings Nos. 108 to 122 in which the composition of at least either inner ring or outer ring was out of the ranges of the invention.

Of Nos. 101 to 107, No. 107 in which the maximum value of compression residual stress at the surface layer portion which constitutes the raceway surface deviates from the preferred range (150 to 2000 MPa) was short in life compared with Nos. 101 to 106 in which the maximum value of compression residual stress satisfied the aforesaid range. It is seen from this that the life can further be prolonged by determining that the maximum value of compression residual stress at the surface layer portion which constitutes the raceway surface is 150 to 2000 MPa.

On the other hand, in Nos. 108 and 109, since the residual of precipitate comprising carbide or the like at the surface layer which constitutes the raceway surface was out of the range (15 to 35% by area) of the invention, their lives were shorter than those calculated.

In Nos. 110 and 111, since the retained austenite volume at the surface layer portion which constitutes the raceway surface was out of the range (15 to 45% by volume) of the invention, their lives were shorter than those calculated.

In Nos. 112 and 113, since the residual austenite volume and the residual of precipitate comprising carbide or the line at the surface layer portion which constitutes the raceway surface were out of the ranges of the invention, their lives were shorter than those of Nos. 108 to 111.

In No. 114, since the test bearing was made of SUJ2, the content of c was greater than the range of the invention, the content of Cr was less than the range of the invention, and the residual austenite volume, the maximum value of residual stress and the residual of precipitate comprising carbide or the like at the surface layer portion which constitutes the raceway surface were out of the ranges of the invention, its life was shorter than a life calculated therefor.

In No. 115, since the content of Cr in a steel making up a material H1 used was less than the range of the invention and the total content of C and Cr was out of the range of the invention, a sufficient hardness at the surface layer portion which constitutes the raceway surface was unable to be obtained, and therefore, its life was shorter than its calculated life.

In No. 116, since the content of Cr in a steel making up a material HI1 used was more than the range of the invention and the residual austenite volume and the residual of precipitate composed of carbide or the like were out of the ranges of the invention, its life was shorter than its calculated life.

In No. 117, since the content of Cr in a steel making up a material HJ1 used was more than the range of the invention and the total content of C and Cr and the residual of precipitate composed of carbide or the like were out of the ranges of the invention, its life was shorter than its calculated life.

In No. 118, since the content of Si in a steel making up a material K1 used was more than the range of the invention and the maximum value of compression residual stress and the residual of precipitate composed of carbide or the like at the surface layer which constitutes the raceway surface were out of the ranges of the invention, its life was shorter than its calculated life.

In No. 119, since the content of Mn in a steel making up a material L1 used was more than the range of the invention and the hardness and the residual austenite volume at the surface layer which constitutes the raceway surface deviated from the ranges of the invention, its life was shorter than its calculated life.

In No. 120, since the content of Mo in a steel making up a material M1 used was more than the range of the invention and coarse and large crystal carbide and eutectic nitride were produced, its life was shorter than its calculated life.

In No. 121, the content of V in a steel making up a material N1 used was more than the range of the invention coarse and large crystal carbide and eutectic nitride were produced, its life was shorter than its calculated life.

In No. 122, the content of Ni in a steel making up a material O1 used was more than the range of the invention and the total content of C and N and the hardness at the surface layer portion which constitutes the raceway surface were out of the ranges of the invention, their lives were shorter than their calculated lives.

Thus, it is found from the results above that the life of the bearing is able to be prolonged even in the event that the bearing is used under much severer environment, provided that the inner ring and the outer ring of the bearing are produced with the compositions numbered 101 to 107 which satisfy the ranges of the invention.

Embodiment 3

Figure 5:
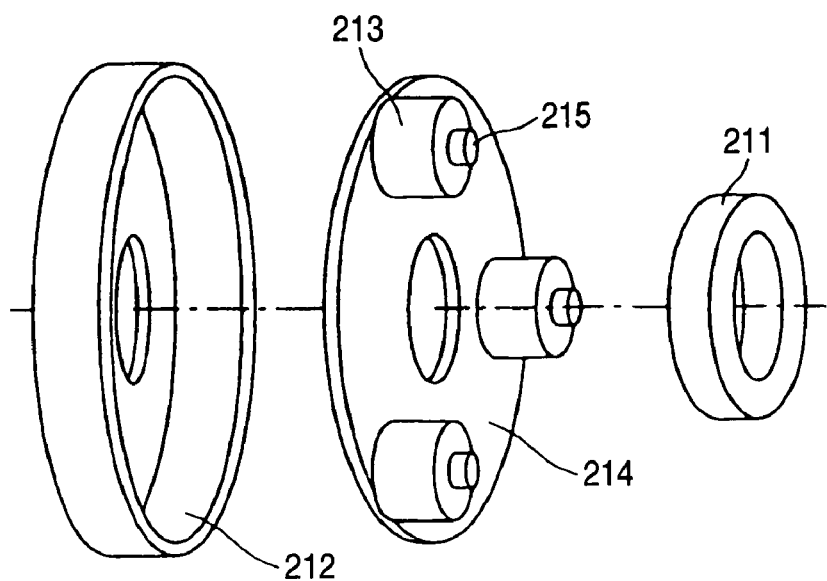
[FIG. 5] is an exploded perspective view of a planetary gear unit.
Figure 6:
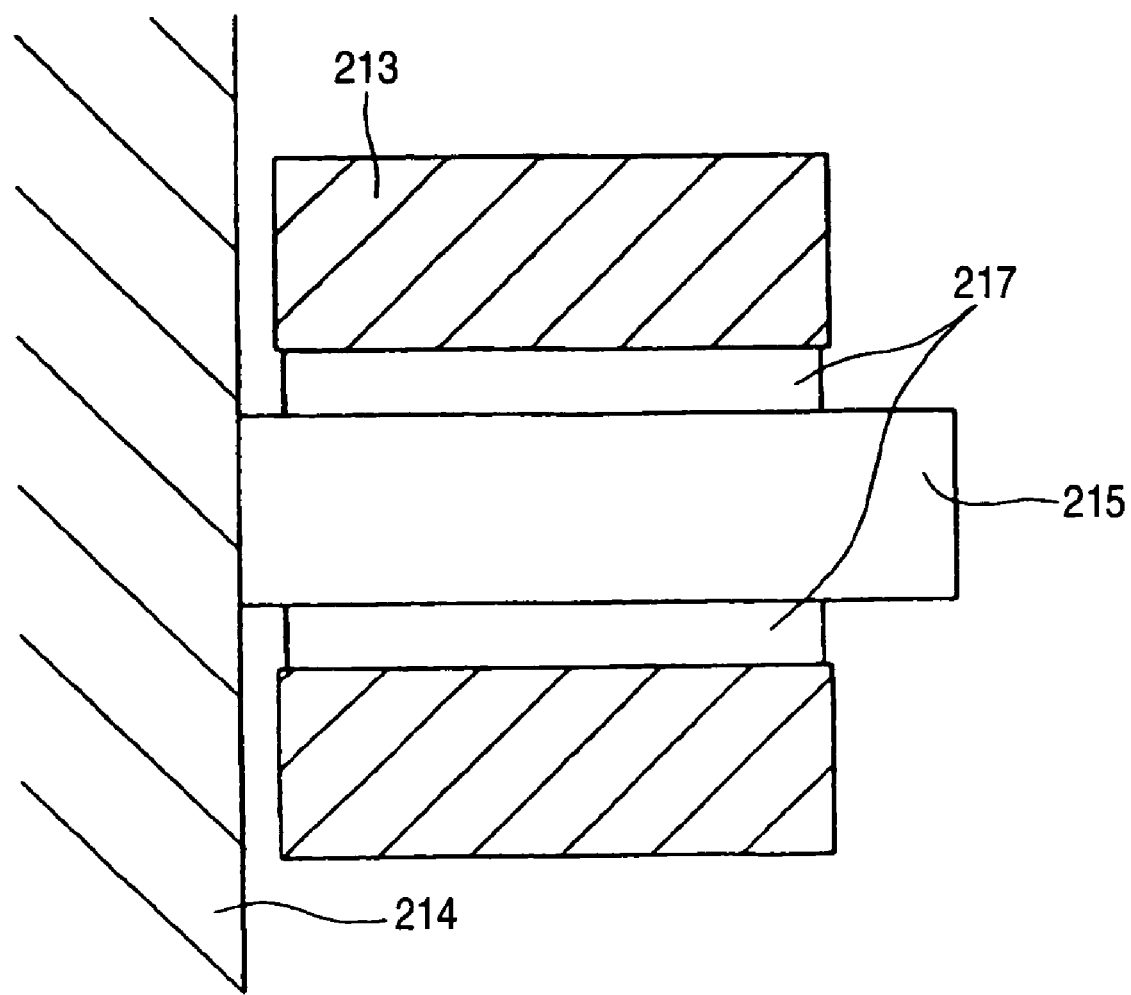
[FIG. 6] is a sectional view of a main part of the planetary gear unit shown in FIG. 5.
Figure 7:
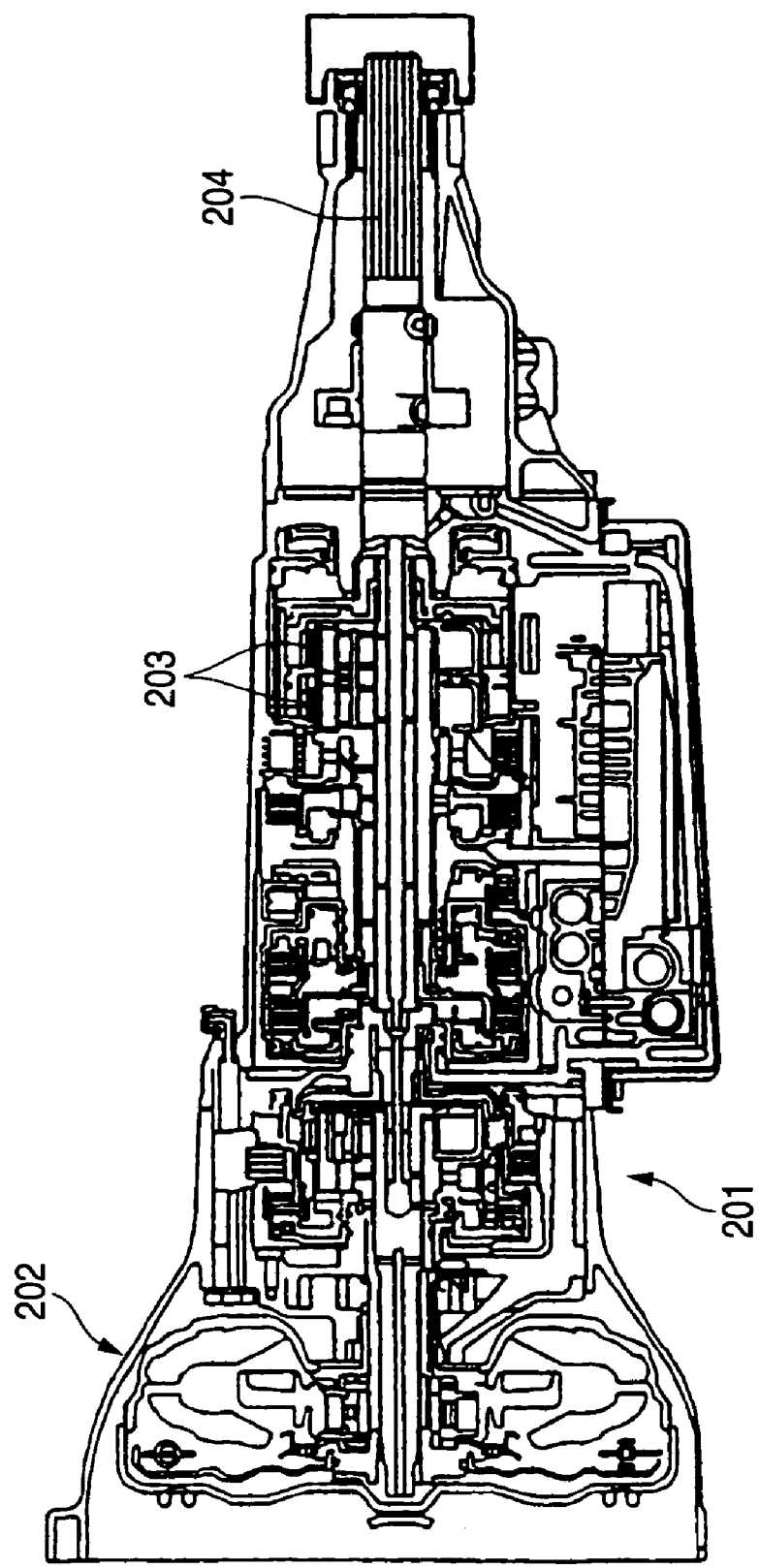
[FIG. 7] is a sectional view of an automatic transmission in which the planetary gear unit is incorporated.

Furthermore, referring to the drawings, a needle roller bearing, which is to be used in a planetary gear set and which constitutes a third embodiment of the invention, will be described in detail. FIG. 5 is an exploded perspective view of a planetary gear set, and FIG. 6 is a sectional view of a main part of the planetary gear set. In addition, FIG. 7 is a sectional view of an automatic transmission in which the planetary gear set shown in FIG. 5 is incorporated.

Torque outputted from an engine, not shown, is transmitted to an automatic transmission 201 via a torque converter 202 and is then reduced in a plurality of speed steps by a speed reduction mechanism made up of a plurality of planetary gear sets 203 which are combined. Then, torque so reduced in speed is outputted to drive-train that are connected to an output shaft 204.

As shown in FIG. 5, the planetary gear set 203 includes a sun gear 211 through which a shaft, not shown, is passed, a ring gear 212 which is arranged concentrically with the sun gear 211, a plurality of planetary gears 213 (three in FIG. 5) which mesh with the sun gear 211 and the ring gear 212 and a carrier 214 which is arranged concentrically with the sun gear 211 and the ring gear 212 and which supports rotatably the planetary gears 213.

As shown in FIG. 6, which is the sectional view of a main part (namely, a planetary gear bearing portion) of the planetary gear set 203, a planetary shaft 215 fixed to the carrier 214 is passed through the center of the planetary gear 213, and a plurality of needle rollers 217 are provided in such a manner as to freely roll between a raceway surface formed on an inner circumferential surface of the planetary gear 213 and a raceway surface formed on an outer circumferential surface of the planetary shaft 215, whereby the planetary gear 213 is allowed to rotate freely abut the planetary shaft 215.

Thus, a radial needle roller bearing is made up of the planetary gear 213, the planetary shaft 215 and the needle rollers, and the radial needle roller bearing so made up constitutes a planetary gear bearing.

Note that the needle rollers 217 may be arranged in a single row as shown in FIG. 6 or in a plurality of rows. In addition, the planetary gear bearing may be a cage and roller type needle roller bearing. Furthermore, the planetary shaft 215 of the embodiment corresponds to an inner ring which constitutes a constituent requirement of the invention, the planetary gear 213 corresponds to an outer ring which also constitute the same requirement, and the needle rollers 217 corresponds to rolling elements which also constitute the same requirement.

In this embodiment, at least one of the planetary shaft 215 and the needle roller 217 is made up of an alloy steel which contains not less than 0.2% by mass, not more than 0.6% by mass carbon, not less than 2.5% by mass, not more than 7% by mass chrome, not less than 0.5% by mass, not more than 2% by mass manganese, not less than 0.1% by mass, not more than 1.5% by mass silicone, and not less than 0.5% by mass, not more than 3% by mass molybdenum. Then, heat treatments were imparted in the order of carbo-nitriding (or carburizing), quenching and tempering, and a sum of carbon concentration and nitrogen concentration at the surface is determined to be not less than 1% by mass, not more than 2.5% by mass. Furthermore, the surface hardness is determined to be not less than HRC60, and the retained austenite volume is determined to be not less than 15% by volume, not more than 45% by volume. Furthermore, the average retained austenite volume is determined to be not more than 8% by volume.

Even when used under high-temperature, high-speed conditions and under lean lubrication, the planetary gear bearing that has the aforesaid composition is difficult to be subjected to seizing, prying and the like and has a long life. In addition, even under high temperatures, the dimensional change due to the decomposition of retained austenite is difficult to be generated. Furthermore, even when the bearing is subjected to moment load, deformation and damage are difficult to be produced (in particular, the deformation of the planetary shaft 215 is difficult to be generated).

While there is no special limitation on the heat treatment conditions, examples will be shown below. After the aforesaid alloy steel is formed into a desired shape by forging or cutting process, a carbo-nitriding treatment (or a carburizing treatment) is applied. The carbo-nitriding treatment (or the carburizing treatment) is performed in an oven into which for example, RX gas, enriched gas and ammonia are introduced and the alloy steel so formed is then held at temperatures of on the order of 900 to 960° C. for several hours. When quenching is carried out direct after this process, there occurs a tendency in which the particle diameter of old austenite is large and a structure comprising mainly large retained austenite particles and lens-like martensite results, leading to an insufficient life. Consequently, after the carbo-nitriding treatment (or the carburizing treatment), the heated alloy steel is once held at a temperature of transformation point A1 for long time or is cooled down to the room temperature, and thereafter, the alloy steel is heated again to on the order of 820 to 900° C. for subsequent quenching, and finally, tempering is carried out at a temperature of on the order of 160 to 200° C. Note that in the event that the aforesaid heat treatments are carried out, a good structure is presented in which fine and highly hard carbide and carbonitride are evenly dispersed in a base structure comprising martensite and austenite.

Figure 8A:
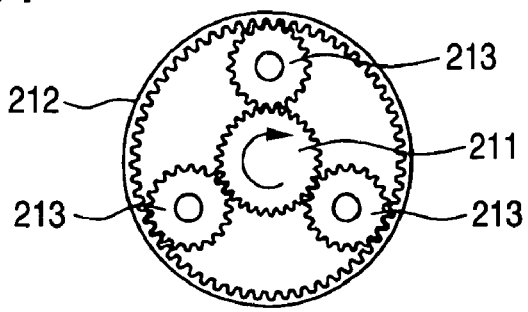
[FIG. 8A] is a diagram which explains an operation principle of a speed reduction mechanism.
Figure 8B:
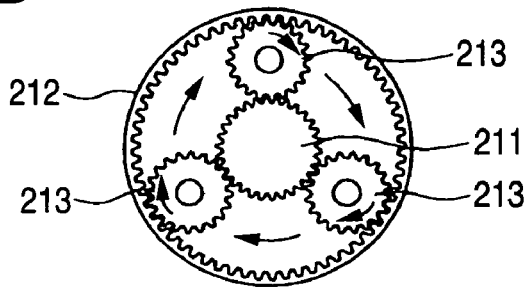
[FIG. 8B] is a diagram which explains the operation principle of the speed reduction mechanism.
Figure 8C:
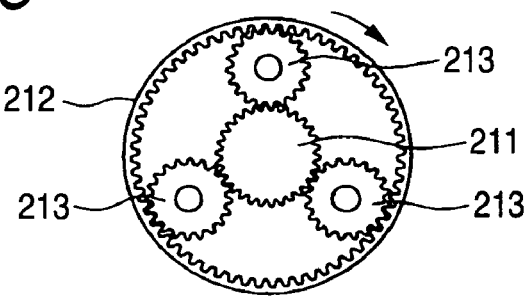
[FIG. 8C] is a diagram which explains the operation principle of the speed reduction mechanism.
Figure 8D:
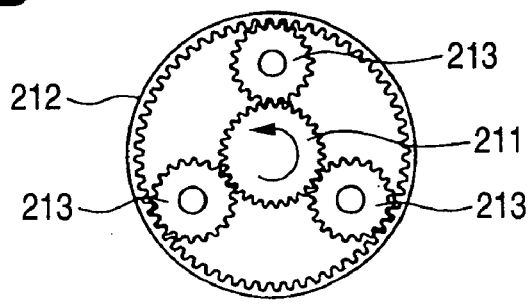
[FIG. 8D] is a diagram which explains the operation principle of the speed reduction mechanism.

Here, referring to FIG. 8, the operation principle of the speed reduction mechanism will be described. Firstly, in the case of a first gear, as shown in FIG. 8A, a large reduction ratio can be obtained by letting the sun gear be a drive gear and the planetary gear 213 (the carrier 214) be a driven gear and fixing the ring gear 212. In the case of a second gear, as shown in FIG. 8B, an intermediate reduction ratio can be obtained by letting the sun gear 211 be stationary, the planetary gear 213 (the carrier 214) be a driven gear and the ring gear 212 be a drive gear. In the case of a third gear, as shown in FIG. 8C, a small reduction ratio can be obtained by letting the sun gear 211 be stationary, the planetary gear 213 (the carrier 214) be a drive gear and the ring gear 212 be a driven gear. Note that in the case of a reverse gear, as shown in FIG. 8D, the rotational direction of toque that is to be outputted can be reversed relative to toque inputted by letting the sun gear 211 be a driven gear, the planetary gear 213 (the carrier 214) be stationary, and the ring gear 212 be a drive gear.

EMBODIMENT EXAMPLES

Hereinafter, the invention will be described in greater detail by showing embodiment examples. Planetary shafts (outside diameter is 12.2 mm, the length is 28.2 mm) which were made of various types of alloy steels having compositions shown in Table 5 were prepared, and durability tests were carried out. Note that other constituents than C, Si, Mn, Cr and Mo in the alloy steels are iron and inevitable impurities. In addition, a steel type G2 shown in Table 5 is the JIS steel type SUJ2.

TABLE 5

| Types of alloy steels | Contents of alloy elements (wt %) | | | | |
| --- | --- | --- | --- | --- | --- |
| | C | Si | Mn | Cr | Mo |
| A2 | 0.5 | 1.0 | 0.5 | 2.5 | 2.0 |
| B2 | 0.45 | 0.65 | 1.0 | 3.0 | 0.9 |
| C2 | 0.4 | 0.6 | 0.6 | 4.0 | 1.0 |
| D2 | 0.6 | 0.4 | 0.7 | 5.0 | 1.2 |
| E2 | 0.2 | 0.8 | 0.5 | 6.0 | 0.6 |
| F2 | 0.3 | 1.5 | 0.5 | 7.0 | 3.0 |
| G2 | 1.0 | 0.3 | 0.3 | 1.5 | 0.0 |
| H2 | 0.4 | 1.0 | 0.3 | 2.0 | 0.5 |
| I2 | 0.5 | 0.75 | 0.8 | 8.0 | 1.0 |
| J2 | 0.7 | 0.35 | 0.4 | 2.5 | 2.0 |
| K2 | 0.9 | 1.6 | 0.4 | 3.0 | 0.5 |
| L2 | 0.4 | 0.75 | 2.5 | 5.0 | 1.0 |
| M2 | 0.3 | 0.3 | 0.9 | 4.0 | 0.4 |
| N2 | 0.5 | 0.8 | 0.5 | 3.0 | 3.5 |

Planetary shafts were produced by applying a cutting process by turning to alloy steels to form then into the predetermined dimensions, applying a carburizing treatment or carbo-nitriding treatment, which will be described later on, to the alloy steels so dimensioned, and applying a finishing grinding to the alloy steels after they were quenched and tempered at predetermined temperatures. Carburizing conditions are such that the atmosphere is a mixture of RX gas and enriched gas, the process time is about 3 to 5 hours and the processing temperature is 820 to 950° C. Carbo-nitriding conditions are such that the atmosphere is a mixture of RX gas, enriched gas and ammonia gas (5%), the process time is about 3 to 5 hours, and the processing temperature is 820 to 950° C.

The properties (superficial retained austenite volume, superficial hardness and the like) of respective planetary shafts obtained were summarized to be shown in Table 6. Note that the carbon concentrations and nitrogen concentrations at the surfaces of the planetary shafts are values resulting from measurements using an electronic probe micro analyzer (EPMA), and the superficial retained austenite volumes ($\gamma_R$) are value resulting from measurements using an X-ray diffraction device.

TABLE 6

| | No. | Types of alloy steels | Superficial C + N[1] | Superficial $\gamma_R$[2] (vol. %) | Superficial hardness HRC | Mean $\gamma_R$[2] (vol. %) | Life (hours) |
| --- | --- | --- | --- | --- | --- | --- | --- |
| Embodiment Examples | 201 | A2 | 1.3 | 15 | 61 | 6 | 1500 |
| | 202 | B2 | 1.0 | 20 | 62 | 3 | 1500 |
| | 203 | C2 | 1.5 | 45 | 63 | 8 | 1500 |
| | 204 | D2 | 2.5 | 30 | 62 | 2 | 1500 |
| | 205 | E2 | 2.0 | 30 | 60 | 3 | 1500 |

TABLE 6-continued

|  | No. | Types of alloy steels | Superficial C + N[1] | Superficial $\gamma_R$[2] (vol. %) | Superficial hardness HRC | Mean $\gamma_R$[2] (vol. %) | Life (hours) |
|---|---|---|---|---|---|---|---|
|  | 206 | F2 | 1.5 | 25 | 63 | 3 | 1500 |
|  | 207 | B2 | 1.7 | 25 | 61 | 9 | 1240 |
|  | 208 | C2 | 1.6 | 30 | 62 | 10 | 1220 |
| Comparison Examples | 201 | G2 | 1.0 | 12 | 62 | 12 | 120 |
|  | 202 | G2 | 1.3 | 30 | 63 | 15 | 330 |
|  | 203 | H2 | 1.4 | 30 | 63 | 5 | 420 |
|  | 204 | I2 | 1.5 | 12 | 64 | 3 | 290 |
|  | 205 | J2 | 1.8 | 40 | 61 | 4 | 550 |
|  | 206 | K2 | 2.5 | 50 | 60 | 8 | 280 |
|  | 207 | L2 | 1.6 | 30 | 64 | 4 | 410 |
|  | 208 | M2 | 1.3 | 30 | 62 | 3 | 440 |
|  | 209 | N2 | 1.2 | 25 | 62 | 2 | 580 |
|  | 210 | B2 | 0.9 | 20 | 61 | 4 | 670 |
|  | 211 | C2 | 2.7 | 50 | 59 | 15 | 310 |

[1] a sum of superficial carbon concentration and nitrogen concentration, and unit is % by mass;
[2] retained austenite volume.

Figure 9:
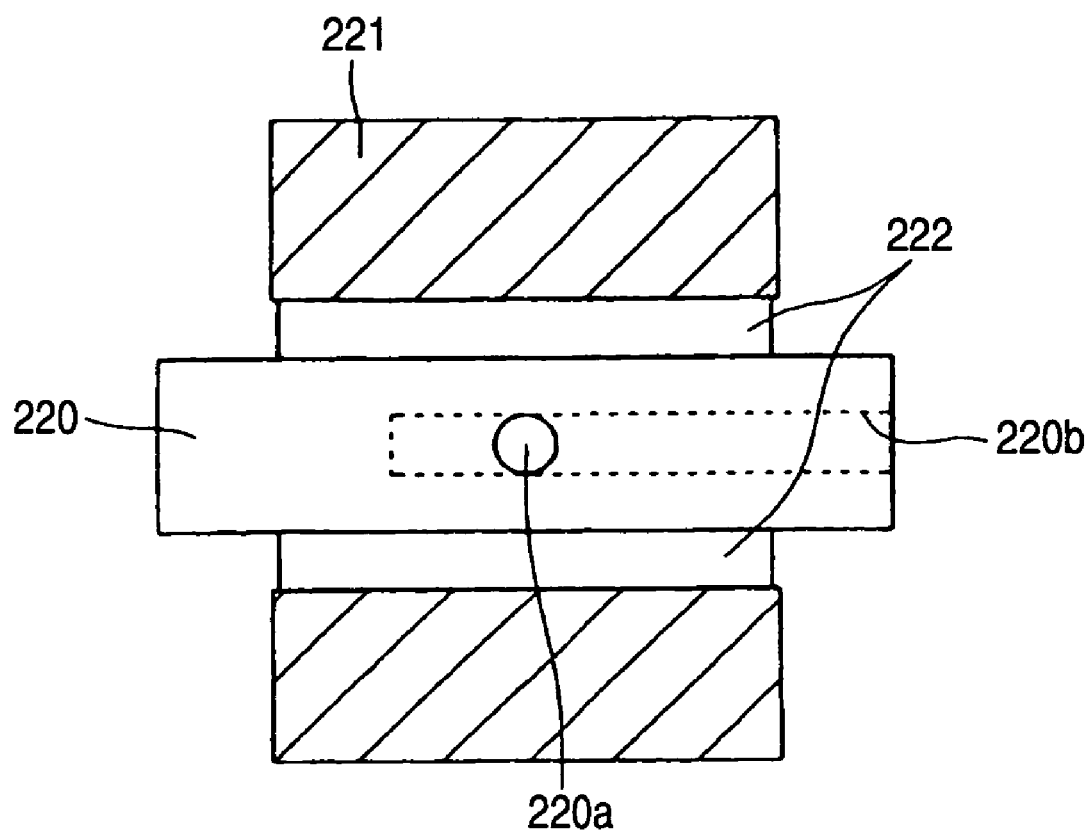
[FIG. 9] is a sectional view which explains a durability test method of a planetary shaft.

Next, referring to FIG. 9, a durability test method will be described below.

A planetary shaft 220 is passed through an outer ring 221, and the planetary shaft 220 is made to rotate by a plurality of needle rollers 222 (outside diameter is 2 mm, the length is 15 mm) that are interposed in such a manner as to freely roll between a raceway surface formed on an outer circumferential surface of the planetary shaft 220 and a raceway surface formed on an inner circumferential surface of the outer ring 221. A lubricating oil feeding hole 220a is opened as shown in the outer circumferential surface (cylindrical surface) of the planetary shaft 220, whereby a lubricating oil injected into an opening 220b in an end face thereof is designed to be fed to the raceway surface from the feeding hole 220a.

The planetary shaft 220 was rotated under conditions of a radial load of 4200N, a rotational speed of 10000 min$^{-1}$, and a lubricating oil temperature of 150° C., and an evaluation was made by determining as life a point where the vibration during rotation became double that at an initial point due to the production of flaking and seizing or a point where the temperature of the planetary shaft 220 drastically increased to reach 185° C. Note that the radial load was imparted to the outer ring 221 via a support bearing, not shown. Additionally, while the temperature of a lubricating oil supplied was 150° C., the temperature of the planetary shaft 220 during the test is assumed to become higher by on the order of 10° C. due to heat produced.

The results of durability tests are shown in Table 6. As is seen from Table 6, Embodiment Examples 201 to 208 had remarkably prolonged lives compared with those of Comparison Examples 201 to 211. In particular, in Embodiment Examples 201 to 206, since the mean retained austenite volume was not more than 8% by volume, no seizing and flaking were generated at all even under the high temperatures and under the condition in which the planetary shafts were subjected to the moment load.

In contrast to this, in Comparison Examples 201 to 209, since the composition of alloy steels were out of the ranges of the invention, their lives were short compared with those of Embodiment Examples 201 to 208. No great advantage was recognized even in view of the facts that Comparison Examples 201, 202 were made of SUJ2 steel, a through hardening was applied to Comparison Example 201 and a carbo-nitriding treatment was applied to Comparison Example 202. In addition, in the case of Comparison Examples 210, 211, while the composition of alloy steels was preferred, as to Comparison Example 210, the sum of superficial carbon concentration and nitrogen concentration was not a preferred value, and as to Comparison Example 211, the sum of superficial carbon concentration and nitrogen concentration and the mean retained austenite volume were totally not preferred, and hence there lives were short.

Embodiment 4

Hereinafter, the advantage of the invention will be verified based on a fourth embodiment and comparison examples.

First of all, materials A3 to Q3 which were made up of steels having compositions shown in Table 7 were cut into shapes of inner rings and outer rings for a deep groove ball bearing (inside diameter of 40 mm, outside diameter of 80 mm, width of 18 mm) of a designation number 6208. As this occurred, the radius of curvature of raceway grooves in the inner ring and the outer ring was formed so as to become 50.5 to 51.5% of the diameter of a ball used.

TABLE 7

| Materials | Steel Composition (wt %) | | | | | | | Remarks |
|---|---|---|---|---|---|---|---|---|
|  | C | Si | Mn | Cr | Mo | V | Ni |  |
| A3 | 0.9 | 1.0 | 0.8 | 2.0 | 2.0 | — | 1.0 | Steels |
| B3 | 1.0 | 0.8 | 1.0 | 3.0 | 0.2 | — | — | of the |
| C3 | 1.1 | 0.8 | 0.5 | 3.0 | 0.4 | 1.0 | 2.0 | present |
| D3 | 1.0 | 1.5 | 0.5 | 4.0 | 0.3 | 0.2 | 0.5 | invention. |
| E3 | 0.9 | 0.5 | 0.5 | 4.0 | 0.5 | 0.1 | 0.2 |  |
| F3 | 1.2 | 0.8 | 0.1 | 4.0 | 0.5 | 0.2 | — |  |
| G3 | 1.0 | 0.8 | 0.3 | 2.5 | 0.1 | — | 0.2 |  |
| H3 | 1.0 | 0.3 | 0.3 | 1.5 | 0.0 | — | — | SUJ2 |
| I3 | 1.0 | 1.0 | 0.5 | 1.5 | 0.5 | — | — |  |
| J3 | 1.0 | 0.75 | 0.8 | 5.0 | 0.1 | 1.0 | 0.5 |  |
| K3 | 0.75 | 1.0 | 0.4 | 3.0 | 0.1 | — | — |  |
| L3 | 1.3 | 0.35 | 0.3 | 2.5 | 0.3 | — | — |  |
| M3 | 0.9 | 0.4 | 0.4 | 3.0 | 0.5 | — | 1.0 |  |
| N3 | 1.0 | 0.8 | 0.5 | 3.0 | 2.5 | 0.4 | — |  |
| O3 | 1.0 | 0.8 | 0.5 | 3.0 | 0.5 | 2.5 | 2.5 |  |
| P3 | 0.9 | 1.6 | 0.4 | 3.5 | 0.3 | 0.1 | — |  |
| Q3 | 1.1 | 0.9 | 2.1 | 3.5 | 0.2 | — | 0.2 |  |

Then, a heat treatment was applied to inner rings and outer rings which were made of the other materials than H3 in which the inner rings and outer rings were heated to 920 to 960° C. under an atmosphere (carbon potential Cp: 0.8 to 1.2, ammonia gas: 3 to 5%) of RX gas+enriched gas+ammonia gas, and were then held 2 to 6 hours for carbo-nitriding, and thereafter, the inner rings and outer rings were oil quenched, and furthermore, they were held in the atmosphere at 160 to 180° C. for 1.5 to 2.5 hours for tempering.

On the other hand, a heat treatment was applied to an inner ring and an outer ring which were made of the material H3 in which the inner ring and the outer ring were heated to 830 to 860° C., were than held for 0.5 to 1.5 hours for quenching, and the inner ring and the outer ring were then oil quenched, and thereafter were held in the atmosphere at 160 to 180° C. for 1.5 to 2.5 hours for tempering.

By the application of the heat treatments like these, carbide, nitride and carbonitride were dispersed and precipitated on the surfaces of the inner rings and the outer rings other than the inner ring and the outer ring which were made of the material H3, and carbide was dispersed and precipitated on the surfaces of the inner ring and the outer ring which were made of the material H3. Then, after the heat treatments, grinding and surface finishing work was carried out so that the surface roughness of the raceway surfaces of the inner rings and the outer rings became 0.01 to 0.03 μmRa.

The total content (by mass ratio) of C and N at the surface layer portion (portions up to a depth of 10 μm from the surface) which constitutes the raceway surface was measured using an emission spectrochemical analyzer.

In addition, the hardness at the surface layer portion (Rockwell hardness) was measured using the Rockwell hardness test method that is regulated under JIS Z 2245.

Furthermore, the retained austenite volume (by volume ratio) at the surface layer portion was measured by the X-ray diffraction device.

Furthermore, the residual (by area ratio) of precipitates composed of carbide and carbonitride in the raceway surface (hereinafter, referred to as a precipitate composed of carbide or the like on the raceway surface) was measured in the following manner.

First of all, after a surface treatment had been applied thereto, the raceway surface was corroded by a corrosion liquid (4 g picric acid+100 ml ethanol) and thereafter were observed in 30 fields of view using an optical microscope of 1000× magnification with respect to carbide and carbonitride of 0.5 μm or greater. Then, the residual (by area ratio) of carbide and carbonitride was measured for each field of view by image processing observed images, and a mean value of the 30 fields of view was calculated.

Furthermore, the residual (by area ratio) of an Fe—Cr, Mo system precipitate of the precipitates of carbide or the like on the raceway surface was measured by observing electron diffraction patterns using a transmission electron microscope.

Furthermore, the total content of Cr and Mo in the Fe—Cr, Mo system precipitate was measured using an energy dispersive spectrometry (EDS) that is auxiliary to the transmission electron microscope.

As to the results of measurement, mean values calculated from the results of measurement of 10 inner rings and outer rings of the same composition are also shown in Table 8.

Figure 10:
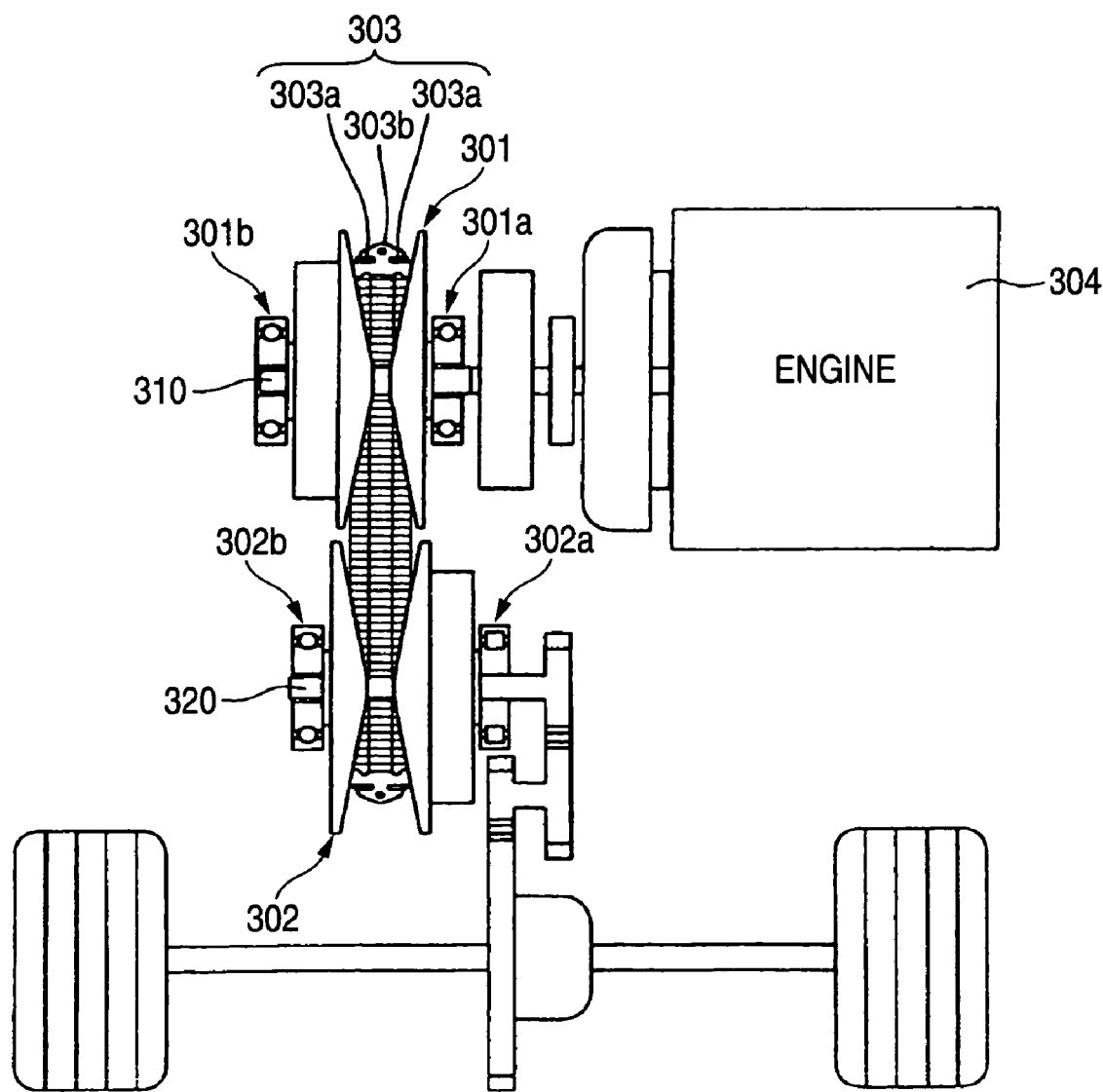
[FIG. 10] is a schematic diagram showing the construction of a continuously variable belt and pulley transmission used in a life test of the embodiment.

Next, test bearings, which included inner rings and outer rings which were numbered from No. 301 to No. 322 and were different in steel composition and heat treatment as shown in Table 8, balls made of high-carbon chrome bearing steel classified as Type 2 (SUJ2) and to which carbo-nitriding treatments were applied and corrugated press retainers made of steel, were set in a continuously variable belt and pulley transmission shown in FIG. 10 for life tests under the following test conditions. Here, ten test samples were prepared for each test bearing, and any of the test samples so prepared utilized as internal clearance a CN clearance (normal clearance). In addition, as a lubricating oil, the following two types of lubricating oil having different friction coefficients were used.

[Types of Lubricating Oil]
(1) Commercially available CVTF
Kinematic viscosity at 40° C.: 30 to 40 cSt
Kinematic viscosity at 100° C.: on the order of 7 cSt
Friction Coefficient at 110° C.: 0.12 (slipping speed: 0.5 m/s)
(2) Commercially available CVTF
Kinematic viscosity at 40° C.: 30 to 40 cSt
Kinematic viscosity at 100° C.: on the order of 7 cSt
Friction Coefficient at 110° C.: 0.14 (slipping speed: 0.5 m/s)

As shown in FIG. 10, in this continuously variable belt and pulley transmission, an input shaft 310 on which an input shaft side (primary) pulley 301 is provided and an output shaft 220 on which an output shaft side (secondary) pulley 302 is provided are supported by pairs of rolling bearings 301a, 301b, 302a, 302b, respectively. Each test bearing was mounted as a primary front bearing (namely, a rolling bearing which supports the input shaft 310 at a position closer to an engine 304 than the primary pulley 301) 301a of the four rolling bearings. The same bearing was used for the other rolling bearings 301b, 302a, 302b in each test.

In addition, a belt 303 of this continuously variable belt and pulley transmission was constructed such that 300 plates 303b were mounted on two band strips 303a which were constructed, in turn, by laminating 10 sheets steel of 0.2 mm thick, and the length of the belt 303 was 600 mm.

[Life Test Conditions]

Load: $P$(loaded load)/$C$(kinematic rated load)=0.26

Input shaft rotational speed: accelerated/decelerated within a range of 500 to 6000 min$^{-1}$ Input torque from engine: 200N·m Lubricating oil supply volume: primary front bearing (10 ml/min), the other bearings (200 ml/min)

Supply oil temperature: 110° C.

This life test was carried out until a flaking was generated on the outer ring or the inner ring and a time spent until the flaking was generated was measured. Then, a total rotating time was obtained which was spent until a flaking was generated on inner rings and outer rings which fall within 10% from the short life side that was determined from the test results of the 10 test bearing samples of the same composition based on the Weibull distribution function, and the total time so obtained was determined as life (life $L_{10}$) The results are shown in Table 8 as well.

In addition, since the calculated lives of the test bearings was 494 hours, the life tests were finished when 1000 hours was reached. Then, when no flaking was generated in both the inner rings and the outer rings even in the event that the test finishing time was reached, their lives $L_{10}$ were determined to be 1000 hours.

TABLE 8

Compositions of Inner Rings and Outer Rings

| | | | Surface Layer Portion | | | Precipitates of Carbide or the like on Raceway Surface | | | |
|---|---|---|---|---|---|---|---|---|---|
| | | | Constituting Raceway Surface | | | | Fe—Cr—Mo System Precipitates | | |
| No. | Materials | Heat Treatments | Contents of C + N (wt %) | Hardness (HRC) | $\gamma_R$ (vol %) | Residual (area %) | Residual (area %) | Content of Cr + Mo (wt %) | Types of Lubricating Oil | Life L10 (hours). |
| 301 | A3 | Carbo-nitriding -> | 1.8 | 62 | 25 | 20 | 30 | 30 | (1) | 950 |
| 302 | B3 | quenching -> | 2.0 | 62 | 30 | 25 | 50 | 50 | (1) | 1000 |
| 303 | C3 | tempering | 1.5 | 63 | 25 | 15 | 60 | 55 | (2) | 1000 |
| 304 | D3 | | 1.4 | 62 | 25 | 35 | 80 | 60 | (1) | 1000 |
| 305 | A3 | | 1.8 | 62 | 35 | <u>10</u> | 45 | 50 | (2) | 980 |
| 306 | E3 | | 1.6 | 62 | 35 | 20 | 30 | 30 | (2) | 940 |
| 307 | F3 | | 1.7 | 62 | 30 | 25 | 50 | 45 | (1) | 940 |
| 308 | G3 | | 2.0 | 61 | 25 | 20 | 45 | 40 | (1) | 930 |
| 309 | B3 | | 2.5 | 62 | 45 | <u>40</u> | 60 | 50 | (1) | 930 |
| 310 | C3 | | 1.0 | 61 | 15 | 25 | <u>25</u> | 40 | (1) | 880 |
| 311 | A3 | | 2.0 | 60 | 35 | 25 | <u>25</u> | <u>25</u> | (1) | 730 |
| 312 | <u>H3</u> | quenching -> | 1.0 | 62 | <u>10</u> | <u>7</u> | <u>10</u> | 3 | (1) | 120 |
| 313 | <u>H3</u> | tempering | 1.0 | 62 | <u>10</u> | <u>7</u> | <u>10</u> | 3 | (2) | 200 |
| 314 | <u>I3</u> | Carbo-nitriding -> | 1.2 | 62 | 35 | <u>8</u> | <u>5</u> | <u>10</u> | (2) | 260 |
| 315 | <u>J3</u> | quenching -> | 1.8 | 62 | 25 | 20 | 80 | 55 | (2) | 540 |
| 316 | <u>K3</u> | tempering | <u>0.9</u> | 63 | <u>8</u> | 10 | <u>5</u> | <u>5</u> | (1) | 240 |
| 317 | <u>L3</u> | | 1.5 | 62 | 25 | 15 | <u>25</u> | <u>20</u> | (1) | 370 |
| 318 | <u>M3</u> | | 2.5 | 59 | <u>50</u> | 15 | 45 | 55 | (1) | 480 |
| 319 | <u>N3</u> | | 1.5 | 63 | 35 | 30 | 50 | 55 | (1) | 580 |
| 320 | <u>O3</u> | | 1.5 | 63 | 30 | 15 | 60 | 55 | (1) | 530 |
| 321 | <u>P3</u> | | 1.8 | 62 | 40 | 25 | 45 | <u>25</u> | (1) | 380 |
| 322 | <u>Q3</u> | | 1.7 | <u>59</u> | <u>50</u> | 15 | 30 | 40 | (2) | 420 |

As is seen from Table 8, test bearings numbered from Nos. 301 to 311 which are Embodiment Examples of the invention had long lives compared with test bearings numbered from 312 to 322 which are Comparison Examples.

Of Nos. 301 to 311, when compared with Nos. 302 to 304, No. 305 in which the residual of a precipitate composed of carbide at the raceway surface was less than 15% and No. 302 in which the residual of the same precipitate exceeded 35% were short in life. It is seen from the above test results that it is preferable to determine that the residual of a precipitate composed of carbide and the like on the raceway surface falls within 15 to 35%.

In addition, when compared with Nos. 302 to 304, No. 301 in which the Cr content was less than the preferred range of the invention, No. 306 in which the Si content was less than the preferred range of the invention, No. 307 in which the Mn content was less than the preferred range of the invention and No. 308 in which the Mo content was less than the preferred range of the invention had shorter lives.

Furthermore, while the residual of a precipitate composed of carbide at the raceway surface falls was within a range of 15 to 35%, the lives of Nos. 310, 311 in which the residual of Fe—Cr, Mo system precipitate was less than 30% were short compared with Nos. 302 to 304. It is seen from this result that it is preferable to determine that 30% or more of the precipitate composed of carbide or the like on the raceway surface be composed of Fe—Cr, Mo precipitate.

Furthermore, the life of No. 311 in which the residual of Fe—Cr, Mo system precipitate was less than 30% and the total content of Cr and Mo was less than 30% was shorter than that of No. 310 in which the residual of Fe—Cr, Mo system precipitate was less than 30% and the total content of Cr and Mo was not less than 30%. It is seen from this fact that it is preferable to determine that the content of Cr and Mo of the Fe—Cr, Mo system precipitate be not less than 30%.

On the other hand, in Nos. 312, 313, since they were made of SUJ2 and the Si content, Cr content and Mo content were less than the ranges of the invention and no sufficient carbide was obtained on the raceway surface, their lives were shorter than their calculated lives.

In No. 314, since the Cr content was less than the range of the invention and no sufficient carbide and carbonitride were obtained on the raceway surface, its life was shorter than its calculated life.

In No. 315, since the Cr content was more than the range of the invention and coarse and large eutectic carbide and eutectic nitride were produced, its life was short.

In No. 316, since the C content was less than the range of the invention and no sufficient Fe—Cr, Mo system precipitate was obtained on the raceway surface, its life was short.

In No. 317, since the C content was more than the range of the invention and no sufficient Fe—Cr, Mo system precipitate was obtained on the raceway surface, its life was shorter than its calculated life.

In No. 318, since the Si content was less than the range of the invention, a sufficient hardness was obtained at the surface layer which constitutes the raceway surface and the retained austenite volume was increased, its life was shorter than its calculated life.

In No. 319, since the Mo content was more than the range of the invention and coarse and large eutectic carbide and eutectic nitride were produced, the life was short.

In No. 320, since the V content was more than the range of the invention and coarse and large eutectic carbide and eutectic carbonitride were produced, its life was short.

In No. 321, since the Si content was less than the range of the invention and the total content of Cr and Mo of Fe—Cr, Mo system precipitate was less than 30%, its life was shorter than its calculated life.

In No. 322, since the Mn content was more than the range of the invention, a sufficient hardness was unable to obtained at the surface layer portion which constitutes the raceway surface and the retained austenite volume was increased, its life was shorter than the calculated life.

It has been now verified from the aforesaid test results that the lives can be prolonged than the calculated lives by constructing inner rings and outer rings according to the compositions shown as Nos. 301 to 311 which satisfy the ranges of the invention even in the event that a lubricating oil is used which has a high friction coefficient of 0.10 and a low kinematic viscosity at 100° C. of 8 cSt.

Note that while in this embodiments, the rolling bearings with no seal were used, when used in a unit in which friction powder resulting from the friction between the input shaft side pulley and the output shaft side pulley and the belt, non-contact seals such as metal seals, rubber seals (nitril rubber, acrylic rubber) and contact seals such as fluorine seals may be used.

In addition, in the rolling bearing according to the invention, while the steel retainer was used, in the event that the bearing is used at faster rotational speeds, a plastic retainer is preferably used.

Furthermore, in the rolling bearing according the invention, while the internal clearance was determined to be the CN clearance, this internal clearance is preferably reduced further with a view to suppressing radial loads and radial loads. In addition, from the same point of view, the radius curvature of the raceway groove of the inner ring and outer ring is preferably made smaller than that used in the invention.

While the invention has been described in detail and by reference to the specific embodiments, it is clear to those skilled in the art that various types of changes and modifications can be made thereto without departing from the spirit and scope of the invention.

This patent application is based on Japanese Patent Application (Patent Application No. 2004-012300) filed on Jan. 20, 2004, Japanese Patent Application (Patent Application No. 2004-077026) filed on Mar. 17, 2004, Japanese Patent Application (Patent Application No. 2004-100181) filed on Mar. 30, 2004, Japanese Patent Application (Patent Application No. 2004-10648) filed on Mar. 31, 2004, and Japanese Patent Application (Patent Application No. 2004-361274) filed on Dec. 14, 2004, and the contents of those Japanese Patent Applications are incorporated herein by reference.

INDUSTRIAL APPLICABILITY

The rolling bearing of the invention is able to preferably be used even under high-temperature, high-speed conditions and under lubrication with lubricating oil with foreign matters incorporated therein. In particular, the rolling bearing of the invention is able to preferably be used in engines and transmissions of automobiles, agriculture-related machines, building machines and steel manufacturing-related machines. Note that similar advantages can be obtained when the invention is applied to other rolling bearings such as deep groove ball bearings, cylindrical roller bearings, tapered roller bearings and needle roller bearings.

The invention claimed is:

1. A rolling bearing comprising an outer ring, an inner ring and a plurality of rolling elements disposed between the outer and inner rings, wherein
at least a member selected from the outer ring, inner ring and rolling elements is such that:
the content of C is not less than 0.2 wt %, not more than 0.6 wt %;
the content of Cr is not less than 2.5 wt %, not more than 7.0 wt %;
the content of Mn is not less than 0.5 wt %, not more than 2.0 wt %;
the content of Si is not less than 0.1 wt %, not more than 1.5 wt %;
the content of Mo is not less than 0.5 wt %, not more than 3.0 wt %; and
the balance is Fe and inevitable impurities;
a carburizing or carbo-nitriding treatment, a quenching treatment and a tempering treatment are applied thereto so that:
the volume % of retained austenite on a surface thereof is not less than 15%, not more than 45%;
the surface hardness is not less than HRC60;
a Fe—Cr, Mo system precipitate comprises at least one of double carbonitrides of $M_7C_3$, $M_{23}C_6$, $M_7(C, N)_3$ and $M_{23}(C,N)_6$; and
the Fe—Cr, Mo system precipitate contains 30 wt % or more of Cr and Mo in total to heighten a melting point of the Fe—Cr, Mo system precipitate and to suppress a phase transformation of the Fe—Cr, Mo system, and wherein
the selected member is further such that:
the sum of carbon concentration and nitrogen concentration on the surface thereof is not less than 1.0 wt % and not more than 2.5 wt %.

2. The rolling bearing as set forth in claim 1, wherein the selected member is further such that:
the content of V is not more than 2.0 wt %; and
the content of Ni is not more than 2.0 wt %.

3. The rolling bearing as set forth in claim 2, wherein the selected member is further such that:
the area % of a precipitate of at least one of carbide and carbonitride is not less than 15%, not more than 35%.

4. The rolling bearing as set forth in claim 3, wherein the selected member is further such that:
the maximum value of compression residual stress at a surface layer portion thereof is not less than 150 MPa, not more than 2000 MPa.

5. The rolling bearing as set forth in claim 1, wherein the selected member is at least one of the inner ring and the rolling elements.

6. The rolling bearing as set forth in claim 5, wherein the selected member is further such that:
an average retained austenite volume of the selected member is not more than 8% by volume ratio.

7. The rolling bearing as set forth in claim 1, wherein the selected member is further such that:
an average retained austenite volume of the selected member is not more than 2.5 times a sum of the contents of Cr and Mo.

* * * * *